United States Patent
Ye et al.

(10) Patent No.: US 11,109,044 B2
(45) Date of Patent: Aug. 31, 2021

(54) COLOR SPACE CONVERSION

(71) Applicant: InterDigital Madison Patent Holdings, SAS, Paris (FR)

(72) Inventors: Yan Ye, San Diego, CA (US); Jie Dong, San Diego, CA (US); Yuwen He, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 301 days.

(21) Appl. No.: 15/108,851

(22) PCT Filed: Dec. 29, 2014

(86) PCT No.: PCT/US2014/072528
§ 371 (c)(1),
(2) Date: Jun. 29, 2016

(87) PCT Pub. No.: WO2015/103124
PCT Pub. Date: Jul. 9, 2015

(65) Prior Publication Data
US 2016/0330457 A1    Nov. 10, 2016

Related U.S. Application Data

(60) Provisional application No. 61/923,169, filed on Jan. 2, 2014.

(51) Int. Cl.
*H04N 19/186*    (2014.01)
*H04N 19/187*    (2014.01)
(Continued)

(52) U.S. Cl.
CPC ......... *H04N 19/186* (2014.11); *H04N 1/6058* (2013.01); *H04N 9/67* (2013.01);
(Continued)

(58) Field of Classification Search
CPC .... H04N 19/186; H04N 19/187; H04N 19/30; H04N 19/43; H04N 19/44; H04N 19/50; H04N 19/96; H04N 1/6058; H04N 9/67
(Continued)

(56) References Cited

U.S. PATENT DOCUMENTS

| 5,504,821 A | 4/1996 | Kanamori et al. |
| 5,995,165 A * | 11/1999 | Oh .......................... H04N 9/68 348/661 |

(Continued)

FOREIGN PATENT DOCUMENTS

| WO | WO2006081253 | * 8/2006 | ........... H04N 19/186 |

OTHER PUBLICATIONS

Philippe Bordes, Color Gamut Scalable Video Coding for SHVC, IEEE, 2013.*

(Continued)

*Primary Examiner* — Nguyen T Truong
(74) *Attorney, Agent, or Firm* — Condo Roccia Koptiw LLP

(57) ABSTRACT

Systems, methods, and instrumentalities are disclosed for color space conversion. A video signal associated with a first color space may be received. The first color space may comprise a point. A partition of the first color space that includes the point may be determined. The partition may be associated with a first dimensionality. The point may be converted from the first color space to a second color space using a color space conversion model that corresponds with the partition. The color space conversion model may be associated with a second dimensionality. The second dimensionality may be less than the first dimensionality.

24 Claims, 15 Drawing Sheets

(51) Int. Cl.
| | |
|---|---|
| *H04N 9/67* | (2006.01) |
| *H04N 1/60* | (2006.01) |
| *H04N 19/30* | (2014.01) |
| *H04N 19/43* | (2014.01) |
| *H04N 19/44* | (2014.01) |
| *H04N 19/50* | (2014.01) |
| *H04N 19/96* | (2014.01) |

(52) U.S. Cl.
CPC ........... *H04N 19/187* (2014.11); *H04N 19/30* (2014.11); *H04N 19/43* (2014.11); *H04N 19/44* (2014.11); *H04N 19/50* (2014.11); *H04N 19/96* (2014.11)

(58) Field of Classification Search
USPC ..................................................... 375/240.08
See application file for complete search history.

(56) References Cited

U.S. PATENT DOCUMENTS

| | | | | |
|---|---|---|---|---|
| RE37,940 E | * | 12/2002 | Imao ..................... | H04N 1/6019 358/1.9 |
| 2008/0043260 A1 | * | 2/2008 | Ramanath ............. | G06T 11/001 358/1.9 |
| 2009/0245628 A1 | * | 10/2009 | Nordback ................. | H04N 1/56 382/166 |
| 2013/0148029 A1 | * | 6/2013 | Gish ........................ | G09G 5/02 348/708 |

OTHER PUBLICATIONS

Auyeung, Cheung, "Color Gamut Scalable Video Coding with Piecewise Linear Predictions", JCTVC-N0271, Joint Collaborative Team on Video Coding (JCT-VC) of ITU-T SG 16 WP 3 and ISO/IEC JTC 1/SC 29/WG 11, 14th Meeting, Vienna, Austria, AT, Jul. 29-Aug. 2, 2013, pp. 1-3.

Auyeung, Cheung, "Non-SCE4: Picture and Region Adaptive Gain-Offset Prediction for Color Space Scalability", JCTVC-O0195, Sony Electronics Inc., Joint Collaborative Team on Video Coding (JCT-VC) of ITU-T SG 16 WP 3 and ISO/IEC JTC 1/SC 29/WG 11, 15th Meeting, Geneva, CH, Oct. 23-Nov. 1, 2013, pp. 1-7.

Bordes et al., "AHG14: Color Gamut Scalable Video Coding using 3D LUT", JCTVC-M0197, Joint Collaborative Team on Video Coding (JCT-VC) of ITU-T SG 16 WP 3 and ISOIIEC JTC 1/SC 29/WG 11, 13th Meeting, Incheon, KR, Apr. 18-26, 2013, pp. 1-10.

Bordes et al., "AHG14: Color Gamut Scalable Video Coding Using 3D LUT: New Results", JCTVC-N0168-r1, Joint Collaborative Team on Video Coding (JCT-VC) of ITU-T SG 16 WP 3 and ISO/IEC JTC 1/SC 29/WG 11,14th Meeting, Vienna, AT, Jul. 25-Aug. 2, 2013, pp. 1-11.

Bordes et al., "Color Mapping SEI Message" , JCTVC-N0180, Technicolor,Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-10.

Bordes et al., "Description of HEVC Scalable Extension Core Experiment SCE1: Color Gamut and Bit-Depth Scalability", JCTVC-01101, CE Coordinators, Joint Collaborative Team on Video Coding (JCT-VC) of ITU-T SG 16 WP 3 and ISO/IEC JTC 1/SC 29/WG 11, Geneva, CH, Oct. 23-Nov. 1, 2013, pp. 1-5.

Bross et al., "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC/SC29/WG11, 9th Meeting: Geneva, CH, Apr. 27-May 7, 2012, 273 pages.

Chen et al., "SHVC Draft 3", JCTVC-N1008_v1, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, 71 pages.

SMPTE, "Derivation of Basic Television Color Equations", RP 177-1993 Reaffirmed 2002, Society of Motion Picture and Television Engineers, NY, US, Nov. 1, 1993.

He et al., "Non-SCE4/AHG14: Combined Bit-Depth and Color Gamut Conversion with 3D LUT for SHVC Color Gamut Scalability", JCTVC-O0161, Joint Collaborative Team on Video Coding (JCT-VC) of ITU-T SG 16 WP 3 and ISO/IEC JTC 1/SC 29/WG 11, 15th Meeting,Geneva, CH, Oct. 23-Nov. 1, 2013, pp. 1-7.

Husak et al., "AHG Report on MPEG Frame-Compatible Stereoscopic Coding", ISO/IEC JTC1/SC29/WG11 m21465, Geneva, CH, Nov. 2011, pp. 1-3.

ISO/IEC, "Information Technology-Coding of Audio-Visual Objects-Part 2:Visual", International Standard, ISO/IEC 14496-2, Second Edition, Dec. 1, 2001, 536 pages.

ISO/IEC, "Information Technology-Coding of Moving Pictures and Associated Audio for Digital Storage Media at Up to About 1,5 Mbit/s—Part 2: Video", International Standard, ISO/IEC 11172-2, Technical Corrigendum 3, Nov. 1, 2003, 6 pages.

ISO, "Information Technology-Generic Coding of Moving Pictures and Associated Audio information: Video", ISO/IEC 13818-2, Dec. 2000, 220 pages.

ISO, "Joint Call for Proposals on Scalable Video Coding Extensions of High Efficiency Video Coding (HEVC)", N12957, ISO/IEC JTC 1/SC 29/WG 11 and ITU-T SG 16 WP 3, Stockholm, Sweden, Jul. 2012, 11 pages.

ITU, " Codec for Audiovisual Services at n x 384 kbit/s", Series H: Audiovisual And Multimedia Systems Coding of Moving Video, International Telecommunication Union, CCITT, H.261, Nov. 1988, 14 pages.

ITU, "Series H: Audiovisual and Multimedia Systems Infrastructure of Audiovisual Services-Coding of Moving Video—Advanced Video Coding for Generic Audiovisual Services", ITU-T, H.264 and ISO/IEC/MPEG 4 part 10, Nov. 2007, 563 pages.

ITU-T/ISO/IEC, "Terms of Reference of the Joint Collaborative Team on 3D Video Coding Extension Development", ITU-T 06/16 Visual Coding and ISO/IEC JTC1/SC29/WG11, Coding of Moving Pictures and Audio, May 2012, 4 pages.

ITU-R, "Parameter Values for the HDTV Standards for Production and International Programme Exchange", Recommendation ITU-R BT 709-6, Jun. 2015, 19 pages.

ITU-R, "Parameter Values for the HDTV Standards for Production and International Programme Exchange", ITU-R Recommendation BT 2020, Aug. 2012, 7 pages.

ITU-T," Video Coding for Low Bit Rate Communication", H.263 ,Series H: Audiovisual And Multimedia Systems, Infrastructure of Audiovisual Services—Coding of Moving Video, Jan. 2005, 226 pages.

Kerofsky et al., "Color Gamut Scalable Video Coding: New Results", JCTVC-L0334, Sharp Labs of America, Joint Collaborative Team on Video Coding (JCT-VC) of ITU-T SG 16 WP 3 and ISO/IEC JTC 1/SC 29/WG 11, 12th Meeting, Geneva, CH, Jan. 14-23, 2013, pp. 1-17.

Li et al., "Non-SCE4: Weighted Prediction Based Color Gamut Scalability", JCTVC-O0180, Qualcomm Inc., Joint Collaborative Team on Video Coding (JCT-VC) of ITU-T SG 16 WP 3 and ISO/IEC JTC 1/SC 29/WG 11, Geneva, CH, Oct. 1-Nov. 1, 2013, pp. 1-5.

Luthra et al., "Requirements of the Scalable Enhancement of HEVC", ISO/IEC JTC1/SC29/WG11 N12956, Coding of Moving Pictures and Audio, Stockholm, Sweden, Jul. 2012, 12 pages.

Luthra et al., "Use Cases of the Scalable Enhancement of HEVC", WG11 Requirements and Video, ISO/IEC JTC1/SC29/WG11 N12955, Coding of Moving Pictures and Audio, Stockholm, Sweden, Jul. 2012, 8 pages.

ISO/IEC, "Call for Proposals on 3D Video Coding Technology", ISO/IEC JTC1/SC29/WG11 MPEG2011/N12036, Geneva, Switzerland, Mar. 2011, 20 pages.

Müller et al., "AHG Report on 3D Video Coding", ISO/IEC JTC1/SC29/WG11 MPEG12/m24033, Geneva, CH, Apr. 2012, pp. 1-24.

Ohm, Jens-Rainer, "Advances in Scalable Video Coding", Proceedings of the IEEE, vol. 93, No. 1, Jan. 2005, pp. 42-56.

(56) References Cited

OTHER PUBLICATIONS

Schwarz et al., "Overview of the Scalable Video Coding Extension of the H.264/AVC Standard", IEEE Transactions on Circuits and Systems for Video Technology, vol. 17, No. 9, Sep. 2007, pp. 1-18.

Segall et al., "SCE4: Summary Report of Color Gamut and Bit Depth Scalability", JCTVC-O0034, CE Coordinators,Joint Collaborative Team on Video Coding (JCT-VC) of ITU-T SG 16 WP 3 and ISO/IEC JTC 1/SC 29/WG 11, Geneva, CH, Oct. 1-Nov. 1, 2013, pp. 1-4.

Segall et al., "Description of Core Experiment SCE4: Color Gamut and Bit-Depth Scalability", JCTVC-N1104, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-5.

Sullivan et al., "Rate-Distortion Optimization for Video Compression", Signal Processing Magazine, IEEE, vol. 15, No. 6, Nov. 1998, pp. 74-90.

Vetro et al., "Overview of the Stereo and Multiview Video Coding Extensions of the H.264/MPEG-4 AVC Standard", Mitsubishi Electric Research Laboratories, Proceedings of IEEE, Jan. 31, 2011, pp. 1-15.

Wikipedia, "3D Lookup Table",Available at https://en.wikipedia.org/wiki/3D_lookup_table , Retrieved on Jun. 23, 2017, 2 pages.

Wikipedia, "Trilinear Interpolation", Available at https://en.wikipedia.org/wiki/Trilinear_interpolation , Retrieved on Jun. 23, 2017, 3 pages.

Wikipedia, "Least Squares Estimation Method", Available online at: http://en.wikipedia.org/wiki/Least_squares , Retrieved on Oct. 10, 2018, 9 pages.

\* cited by examiner

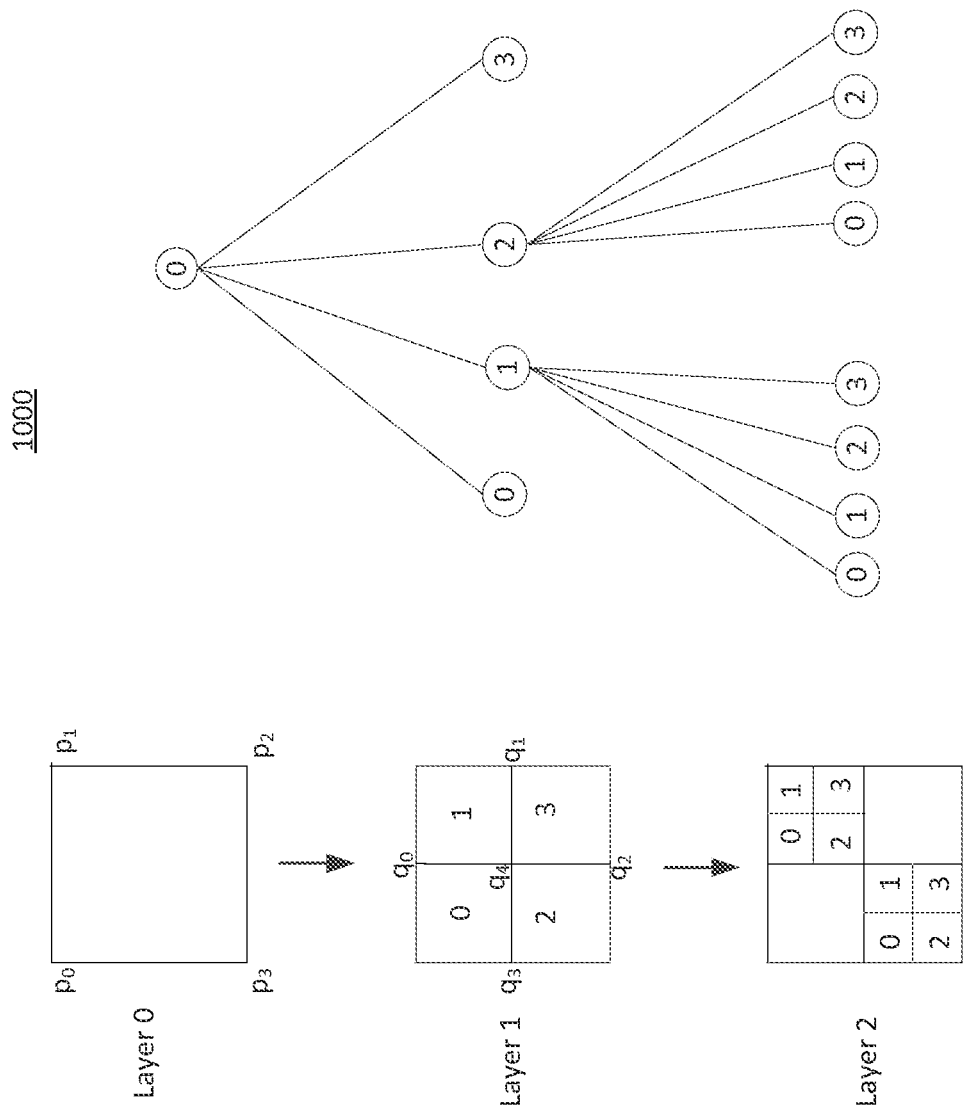

COLOR SPACE CONVERSION

CROSS REFERENCE TO RELATED APPLICATIONS

This application is the National Stage Entry under 35 U.S.C. § 371 of Patent Cooperation Treaty Application No. PCT/US2014/072528, filed Dec. 29, 2014, which claims the benefit of U.S. Provisional Patent Application No. 61/923,169, filed Jan. 2, 2014, the content of which is hereby incorporated by reference herein.

BACKGROUND

Various digital video compression technologies may enable efficient digital video communication, distribution, and consumption. Some standards have been developed by ISO/IEC and ITU-T, including, for example, H.261, MPEG-1, MPEG-2, H.263, MPEG-4 (part-2), and H.264/AVC (MPEG-4 part 10 Advance Video Coding). High Efficiency Video Coding (HEVC), under joint development by ITU-T Video Coding Experts Group (VCEG) and ISO/IEC Moving Picture Experts Group (MPEG), may achieve substantially higher coding efficiency than H.264/AVC. HEVC may achieve twice as much compression as H.264/AVC or half the bit rate at the same video quality.

Video applications, such as IPTV, video chat, mobile video, and streaming video, may be deployed in heterogeneous environments. Such heterogeneity may exist on the client or clients and/or in the network. For example, on the client side, an N-screen scenario in which video content may be consumed on devices with varying screen sizes and display capabilities (e.g., smartphones, tablets, PCs, and/or TVs) may be used. Such devices may have differing capabilities in terms of computing power, memory/storage size, display resolution, display frame rate, display color gamut, etc.

On the network side, video may be transmitted across the Internet, WiFi networks, mobile (3G and/or 4G) networks, and/or any combination of networks. Such networks may have varying characteristics in terms of packet loss rate, available channel bandwidth, burst error rate, etc. Video data may be transmitted over a combination of wired networks and wireless networks, further complicating the underlying transmission channel characteristics.

SUMMARY

Systems, methods, and instrumentalities are disclosed for color gamut conversion (e.g., color space conversion). A lookup table (LUT) may be used to reduce computational complexity and/or storage requirements. Triangular interpolation and/or linear interpolation may be used to reduce computational complexity by reducing the number of multiplication operations performed for interpolation relative to, for example, tetrahedral or trilinear interpolation. Storage requirements can be reduced by storing LUT entries in a two-dimensional or one-dimensional LUT, rather than a three-dimensional LUT, for example.

An encoder may code a lookup table for color gamut conversion. The encoder may segment a first color space into a plurality of partitions (e.g., sectors). For example, the encoder may segment a three-dimensional color space into octants (e.g., cubes), a two-dimensional color space into quadrants (e.g., squares or rectangles), or a one-dimensional color space into segments. The encoder may receive a set of input coordinates in a first, three-dimensional, color space. The encoder may perform triangular interpolation and/or linear interpolation on the set of input coordinates to generate a set of output coordinates in the second color space. The encoder may store the set of output coordinates in a lookup table, which may be a 3D, 2D, or 1D lookup table.

A method (e.g., a computer-implemented method) may be provided. The method may include one or more of the following. Receiving (e.g., via a receiver) a video signal associated with a first color space. The first color space may comprise a point. Determining (e.g., at a processor) a partition of the first color space that includes the point. The partition may be associated with a first dimensionality. Converting (e.g., at the processor) the point from the first color space to a second color space using a color space conversion model that corresponds with the partition. The color space conversion model may be associated with a second dimensionality. The second dimensionality may be less than the first dimensionality.

The first color space and the second color space may be characterized by three components. The three components may comprise a luma component, a first chroma component and a second chroma component. The point may be associated with a value for each of the three components. The color space conversion model may determine a value of one of the three components in the second color space based on the values of two (e.g., only two) of the three components at the point in the first color space.

The point may be associated with a luma value, a first chroma value, and a second chroma value. The color space conversion model may determine a luma value in the second color space that corresponds with the point based on the luma value at the point in the first color space and either the first chroma value at the point in the first color space or the second chroma value at the point in the first color space. The color space conversion model may determine a value for a first chroma component in the second color space that corresponds with the point based on the luma value of the point in the first color space and the first chroma value at the point in the first color space (e.g., based on first color space values of the luma component and the first chroma component, and not the second chroma component).

Determining the partition may comprise partitioning the first color space into a plurality of partitions. A first partition of the plurality of partitions may be associated with a first color space conversion model. A second partition of the plurality of partitions may be associated with a second color space conversion model. The first color space conversion model and the second color space conversion model may comprise different model parameters.

The partition may comprise an octant or a cube. The method may further comprise receiving the color space conversion model. Receiving the video signal may comprise receiving the color space conversion model in a portion of the video signal.

Converting the point from the first color space to the second color space may comprise one or more of the following. Determining a projection of the point in the partition onto a plane of the partition. Determining a first distance of the projected point from a first axis in the plane. Determining a second distance of the projected point from a second axis in the plane. Determining three other points in the partition. Determining three values of a first component in the second color space, wherein each of the three values corresponds with one of the three other points. Determining a value of the first component in the second color space that corresponds with the point based on the first distance, the second distance and the three values of the first component in the second color space.

Determining the value of the first component in the second color space that corresponds with the point may comprise determining, in the second color space, the value of the first component that corresponds with the point using triangular interpolation. The first axis may be associated with the first component and the second axis may be associated with a second component. Determining the three values of the first component in the second color space may comprise retrieving the three values from a non-transitory memory (e.g., a LUT that may be stored in the memory).

The method may further comprise determining a value of a second component, in the second color space, that corresponds with the point. The value of the second component may be determined based on a second projection of the point onto a second plane. The second plane may comprise a lama axis and a chroma axis. The second plane may comprise a first chroma axis and a second chroma axis.

Converting the point from the first color space to the second color space may comprise one or more of the following. Determining a projection of the point in the partition onto an axis of the partition. Determining a distance of the projected point from a first point in the axis. Determining a second point in the axis. The first point and/or the second point may be vertices of the partition. Determining two values of a first component in the second color space, wherein the two values correspond with the first point and the second point. Determining a value of the first component in the second color space that corresponds with the point based on the distance and the two values of the first component in the second color space.

Determining the value of the first component in the second color space that corresponds with the point may comprise determining, in the second color space, the value of the first component that corresponds with the point using linear interpolation. The axis may be associated with the first component. Determining the two values of the first component in the second color space may comprise retrieving the two values from a LUT (e.g., a non-transitory memory that may store the LUT).

The method may further comprise determining a value of a second component, in the second color space, that corresponds with the point. The value of the second component may be determined based on a second projection of the point onto a second axis. The second axis may be associated with the second component. The video signal may be associated with a scalable video. The scalable video may comprise a base layer that may comprise data associated with the first color space and an enhancement layer that pray comprise data associated with the second color space.

A decoder may be provided. The decoder may comprise a processor. The processor may be configured to perform any of the methods disclosed herein. The processor may be configured for one or more of the following. The processor may receive a video signal associated with a first color space. The first color space may comprise a point. The processor may determine a partition of the first color space that includes the point. The partition may be associated with a first dimensionality. The processor may convert the point from the first color space to a second color space using a color space conversion model that corresponds with the partition. The color space conversion model may be associated with a second dimensionality. The second dimensionality may be less than the first dimensionality.

The processor may convert the point from the first color space to the second color space through one or more of the following. The processor may determine a projection of the point in the partition onto a plane of the partition. The processor may determine a first distance of the projected point from a first axis in the plane. The processor may determine a second distance of the projected point from a second axis in the plane. The processor may determine three other points in the partition. The processor may determine three values of a first component in the second color space. Each of the three values may correspond with one of the three other points. The processor may determine a value of the first component in the second color space that corresponds with the point based on the first distance, the second distance and the three values of the first component in the second color space.

The processor may convert the point from the first color space to the second color space through one or more of the following. The processor may determine a projection of the point in the partition onto an axis of the partition. The processor may determine a distance of the projected point from a first point in the axis. The processor may determine a second point in the axis. The processor may determine two values of a first component in the second color space. The two values may correspond with the first point and the second point. The processor may determine a value of the first component in the second color space that corresponds with the point based on the distance and the two values of the first component in the second color space.

BRIEF DESCRIPTION OF THE DRAWINGS

FIG. 9 illustrates an example quadtree structure for two-dimensional LUT coding.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Scalable video coding may be used to improve the user experience and/or video quality of service. Scalable video coding may involve encoding the signal once at a highest resolution and enabling decoding from subsets of the streams depending on the specific rate and/or resolution used by certain applications and/or supported by a client device. Resolution may include one or more video parameters, including, but not limited to, spatial resolution (e.g., picture size), temporal resolution (e.g., frame rate), and/or video quality (e.g., subjective quality, such as MOS, and/or objective quality, such as PSNR, SSIM, and/or VQM). Other video parameters may include chroma format (e.g., YUV420, YUV422, and/or YUV444), bit depth (e.g., 8-bit or 10-bit video), complexity, view, gamut (e.g., color space), and/or aspect ratio (e.g., 16:9 or 4:3). Some video standards, such as MPEG-2 Video, H263, MPEG-4 Visual, and H264, may have tools and/or profiles that may support scalability modes.

Scalability, such as but not limited to spatial scalability (e.g., the scalable bitstream may include signals at more than one spatial resolution), quality scalability (e.g., the scalable bitstream may include signals at more than one quality level), and/or standard scalability (e.g., the scalable bitstream may include a base layer coded using H.264/AVC and one or more enhancement layers coded using HEVC) may be supported. Quality scalability may be referred to as SNR scalability. Scalability may also include view scalability, e.g., the scalable bitstream may include 2D and 3D video signals.

Figure 1:
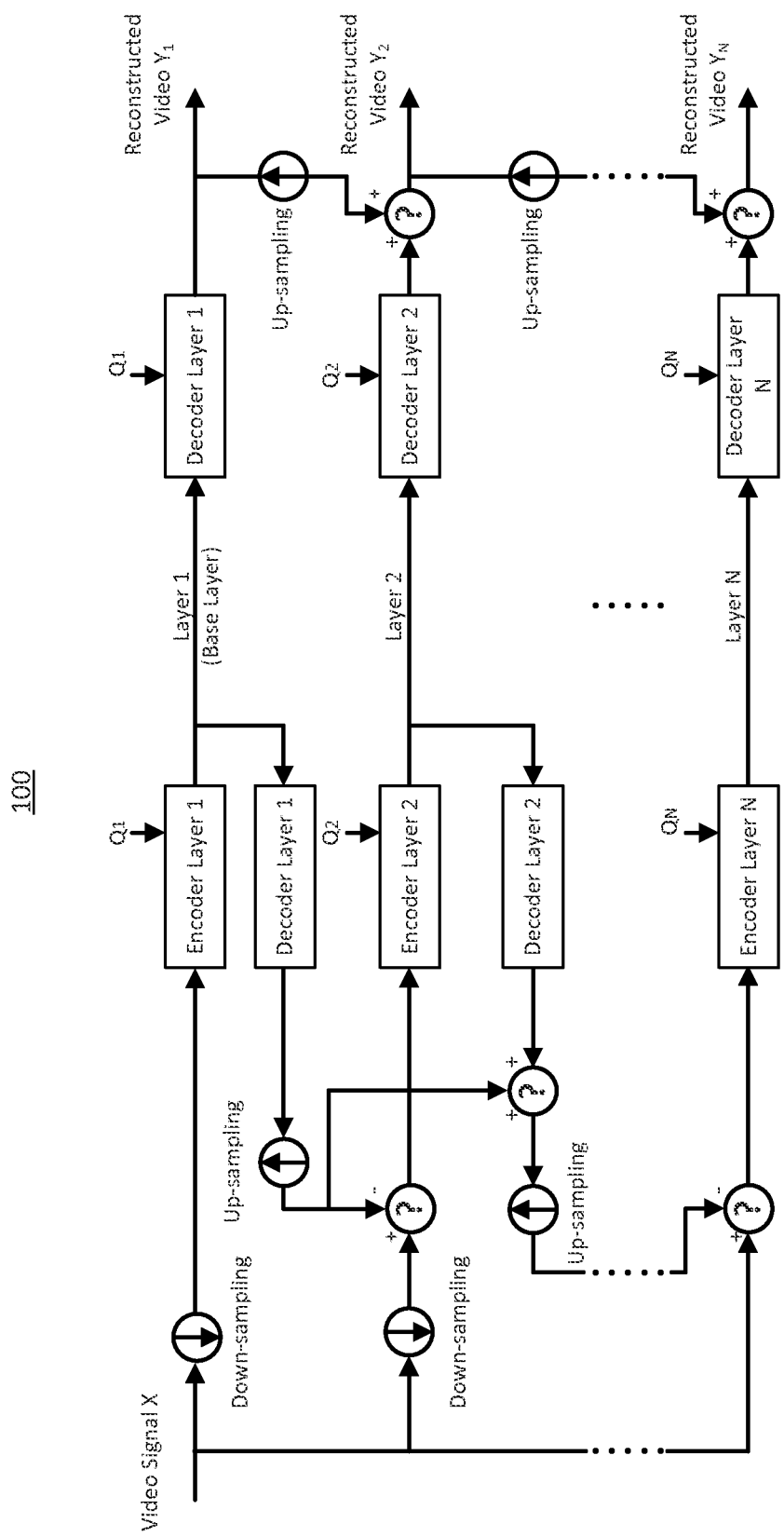
FIG. 1 is a block diagram illustrating an example block-based hybrid scalable video encoding system.

FIG. 1 is a block diagram illustrating an example block-based hybrid scalable video encoding system 100. The spatial/temporal signal resolution to be represented by a layer 1 (e.g., a base layer) may be generated by downsampling an input video signal (e.g., video signal X) at 101. In a subsequent encoding stage, an appropriate setting of a quantizer Q1 may lead to a certain quality level of the base information. A base layer reconstruction Y1, an approximation of higher layer resolution levels, may be utilized in encoding and/or decoding of the subsequent layers, for example to more efficiently encode the subsequent higher layers.

An upsampling unit 110 may perform upsampling of the base layer reconstruction signal to layer 2's resolution. Downsampling and upsampling may be performed throughout one or more layers, e.g., all layers (1, 2 . . . N). The downsampling and upsampling ratios may be different based on the dimension of the scalability between two given layers. In the system in FIG. 1, for a given higher layer n ($2 \leq n \leq N$), a differential signal may be generated by subtracting an upsampled lower layer signal (e.g., layer n−1 signal) from a current layer n signal. The differential signal may be encoded. The corresponding downsampling and upsampling operations may be bypassed, for example if the video signals represented by two layers, n1 and n2, have the same spatial resolution.

A given layer n ($1 \leq n \leq N$) or a plurality of layers may be decoded without using decoded information from higher layers. Relying on coding of the residual signal (e.g., difference signal between two layers) for layers other than the base layer, as may be performed by the system 100 in FIG. 1, may cause visual artifacts due to quantization and normalization of the residual signal to restrict its dynamic range and/or additional quantization performed during coding of the residual signal. Some or all of the higher layer encoders may adopt motion estimation and motion compensated prediction as an encoding mode. Motion estimation and compensation in residual signal may be different from other forms of motion estimation, and may be more prone to visual artifacts. To reduce or minimize such visual artifacts, more sophisticated residual quantization, as well as joint quantization between restriction of the dynamic range of the residual signal and coding of the residual signal may be performed, potentially increasing system complexity. The system 100 may not consider other inter-layer prediction modes, limiting the level of compression efficiency it can achieve.

Scalable Video Coding (SVC) may enable the transmission and decoding of partial bit streams to provide video services with lower temporal or spatial resolutions or reduced fidelity while retaining a relative high reconstruction quality given the rate of the partial bit streams. An SVC decoder may use single loop decoding to set up a single motion compensation loop at the layer being decoded and may omit setting up motion compensation loops at other lower layers. For example, a bitstream may include two layers: a first layer (e.g., layer 1, for example a base layer) and a second layer (e.g., layer 2, for example an enhancement layer). If the decoder determines to reconstruct layer 2 video, the decoder may set up a decoded picture buffer and motion compensated prediction for layer 2 (e.g., but not for layer 1, the base layer on which layer 2 may depend). By setting up a decoded picture buffer and/or motion compensated prediction for layer 2, SVC may fully reconstruct video without using reference pictures from lower layers, which for example, may reduce computational complexity and memory requirements at the decoder.

Single loop decoding may be achieved by constrained inter-layer texture prediction, where, for a current block in a given layer, spatial texture prediction from a lower layer may be permitted if the corresponding lower layer block is coded in intra mode (e.g., restricted intra prediction). When the lower layer block is coded in intra mode, it can be reconstructed without motion compensation operations and decoded picture buffer. SVC may use additional inter-layer prediction techniques, such as motion vector prediction, residual prediction, mode prediction, etc. from lower layers, for example to improve rate distortion efficiency of an enhancement layer. Although single loop decoding may reduce the computational complexity and memory requirements at the decoder, it may increase implementation complexity by using block-level inter layer prediction methods to achieve satisfactory performance. Furthermore, to compensate for the performance penalty incurred by imposing the single loop decoding constraint, encoder design and computation complexity may be increased to achieve desired performance.

Multi-view Video Coding (MVC) may provide view scalability. View scalability may mean that the base layer bitstream can be decoded to reconstruct a two-dimensional (2D) video, and additional enhancement layers can be decoded to reconstruct other view representations of the same video signal. When the views are combined together and displayed by a proper three-dimensional (3D) display, the user experience 3D video with proper depth perception.

Figure 2:
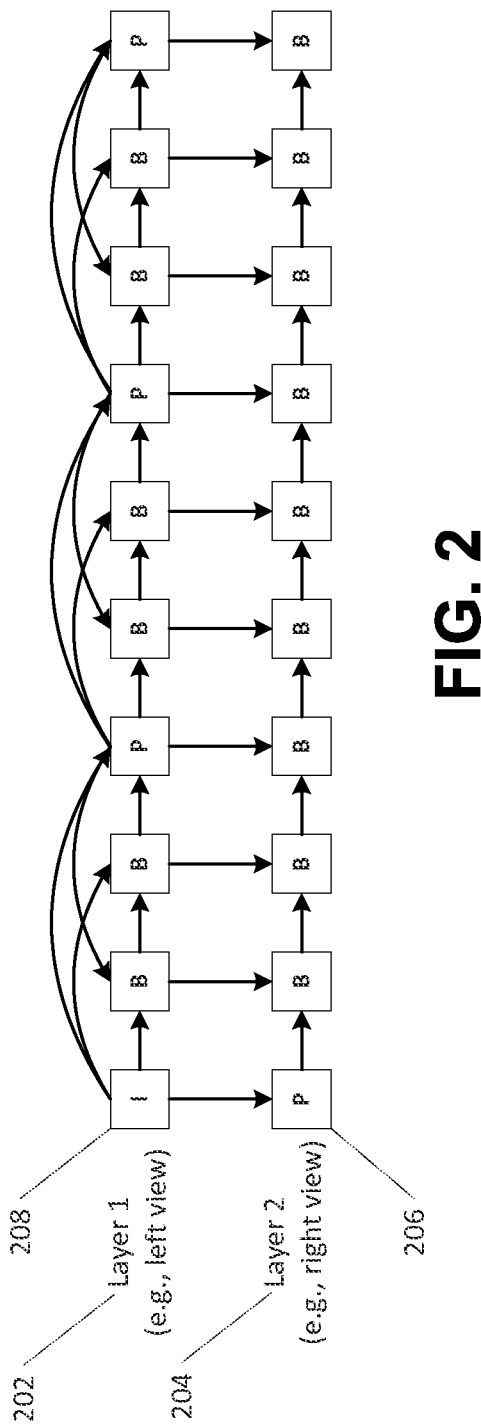
FIG. 2 illustrates an example prediction structure of using multi-view video coding (MVC) to code a stereoscopic video.

FIG. 2 illustrates an example prediction structure of using MVC to code a stereoscopic video with a left view 202 (e.g., layer 1) and a right view 204 (e.g., layer 2). The left view video 202 may be coded with an IBBP prediction structure, while the right view video 204 may be coded with a PBBB prediction structure. In the right view 204, the first picture 206 collocated with the first I picture 208 in the left view may be coded as a P picture, and the other pictures in the right view 204 may be coded as B pictures with the first prediction coming from temporal references in the right view 204, and the second prediction coming from inter-layer reference in the left view 202. Stereoscopic 3D TVs are available commercially for enjoying 3D content (e.g., movies, live sports, etc.) at home and may involve the use of 3D glasses. Unlike SVC, MVC may not support single loop decoding.

As shown in FIG. 2, decoding of the right view 204 (e.g., layer 2) video may use the pictures in the left view 202, (e.g., layer 1) video. MVC uses motion compensation loops in both views (e.g., layers). MVC may include high-level syntax changes. MVC may omit block-level changes to H.264/AVC. This may lead to ease of implementation, as the underlying MVC encoder/decoder logics may remain the same and may be easily duplicated. MVC may be enabled by configuring the reference pictures at the slice/picture level. This, coupled with an increase of 3D video content (e.g., 3D movie production and 3D live sports broadcasting), may allow MVC to enjoy wider commercial success compared to SVC. MVC may also support coding of more than two views by performing inter-layer prediction across multiple views.

Another 3D video coding technique is MPEG Frame Compatible (MFC) coding. Some 3D content may be stereoscopic 3D video that may include two views, e.g., a left view and a right view. Some existing stereoscopic 3D content delivery may be achieved by packing/multiplexing the two views into one frame, compressing, and transmitting the packed video with a standard, such as H.264/AVC, for example. At the receiver side, after decoding, the frames may be unpacked and displayed as two views. Such multiplexing of the views may be done in the temporal domain or spatial domain. When done in the spatial domain, the two views may be spatially downsampled by a factor of two and packed by various arrangements, for example, in order to maintain the same picture size. For example, side-by-side arrangement may put the downsampled left view on the left half of the picture, and the downsampled right view on the right half of the picture. Other arrangements may include top-and-bottom, line-by-line, checkerboard, and others. The specific arrangement used to achieve frame compatible 3D video can be conveyed by frame packing arrangement supplemental enhancement information (SEI) messages. Although such arrangement may achieve 3D delivery with a modest increase in bandwidth requirement, spatial downsampling can cause aliasing in the views and reduce the visual quality and user experience of 3D video. A scalable extension may be provided to frame compatible (e.g., two views packed into the same frame) base layer video. One or more enhancement layers may be provided to recover the full resolution views for improved 3D experience. Spatial scalability technologies may be used to enable full-resolution MFC coding.

Scalable HEVC may include standards scalability. Standards scalability may refer to the type of scalability when the base layer may be encoded with a first standard (e.g., an earlier standard, such as H.264/AVC or MPEG2), while one or more enhancement layers may be encoded using a second standard (e.g., a later standard, such as HEVC). Standards scalability may provide backward compatibility for legacy content already encoded using previous standards and may enhance the quality of the legacy content with one or more enhancement layers encoded with later standards like HEVC that may provide better coding efficiency.

3D video coding, or 3DV, may provide view scalability targeted for autostereoscopic applications. Autostereoscopic displays and applications may allow people to experience 3D without glasses. In order to achieve a satisfactory 3D experience without glasses, more than two views may be used. Coding many views (e.g., nine or ten views) can be very expensive. 3DV may use a hybrid approach of coding a few views (e.g., two or three views) with relatively large disparity together with the depth maps that provide depth information of the views. At the display side, the coded views and depth maps may be decoded, and the remaining views may be generated using the decoded views. Their depth maps may be generated using view synthesis technologies, 3DV may use various methods to code the views and the depth maps, for example, coding them using a combination of different standards such as H.264/AVC, MVC, and HEVC, including coding the base layer with one standard (e.g., H.264/AVC) and coding one or more enhancement layers with another standard (e.g., HEVC). 3DV may provide a menu of different options for applications to choose from.

Table 1 summarizes examples of different types of scalabilities and standards that may support them. Bit-depth scalability and chroma format scalability may be tied to video formats (e.g., higher than 8-bit video, and chroma sampling formats higher than YUV4:2:0) used by professional video applications. Aspect ratio scalability and color gamut scalability may be provided.

TABLE 1

Examples of different types of scalabilities

| Scalability | Example | Standards |
| --- | --- | --- |
| View scalability | 2D→3D (2 or more views) | MVC, MFC, 3DV |
| Spatial scalability | 720p→1080p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC |
| Chroma format scalability | YUV4:2:0→YUV4:2:2, YUV4:4:4 | Scalable HEVC |
| Aspect ratio scalability | 4:3→16:9 | Scalable HEVC |
| Color gamut scalability | BT.709(HDTV) → BT.2020(UHDTV) | Scalable HEVC |

Ultra high definition TV (UHDTV) may support larger resolution, higher frame rate, and wider color gamut compared to the HDTV specification. The user experience may be greatly improved due to the high fidelity quality that UHDTV may provide. UHDTV may support up to 4K (3840×2160) and 8K (7680×4320) resolution, with the frame rate being up to 1120 Hz, and the bit depth of picture samples being 10 bits or 12 bits. The color space of UHDTV may be defined by BT.2020.

Figure 3:
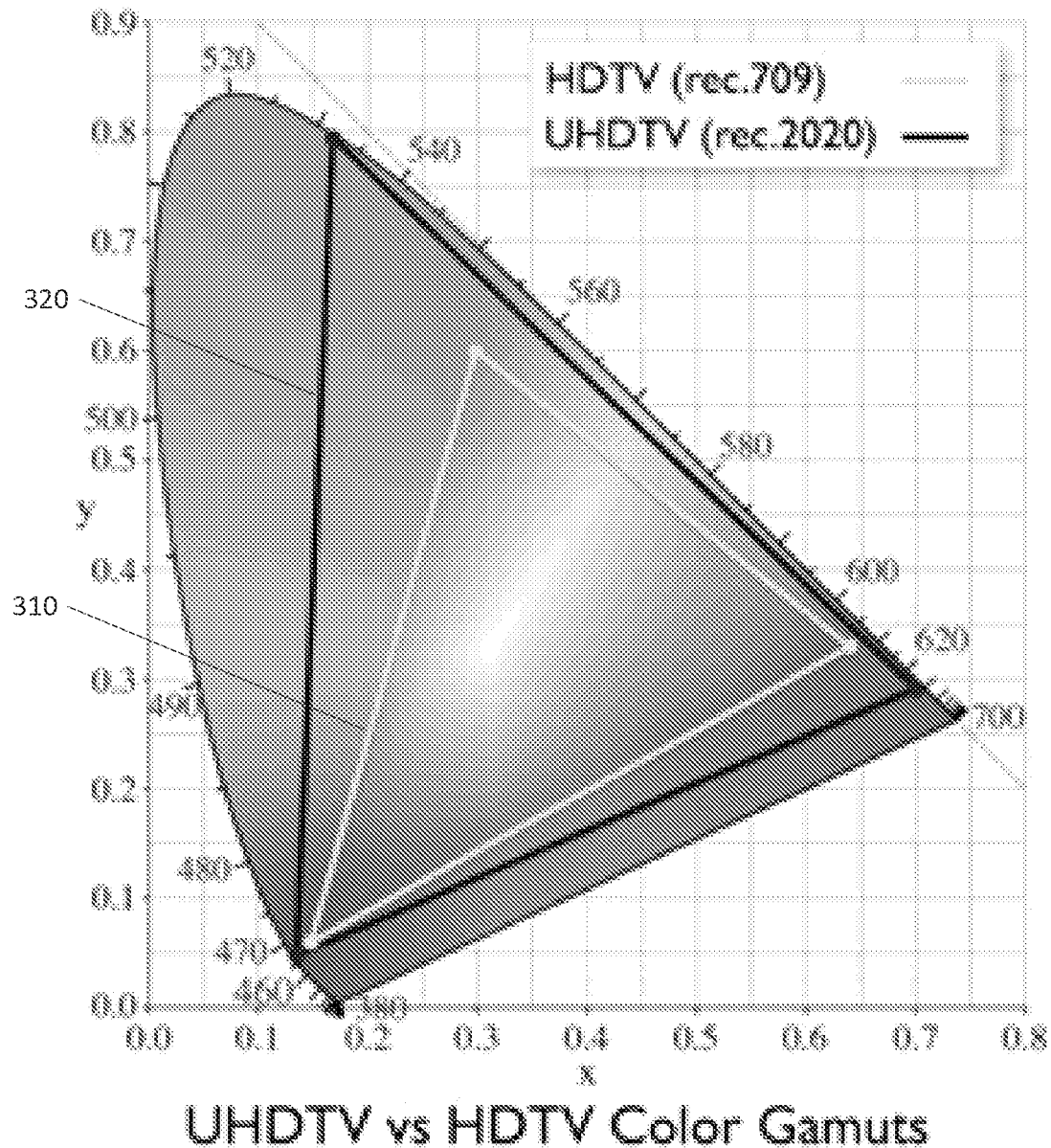
FIG. 3 shows an example comparison between a first color space (e.g., BT.709, for example HDTV) and a second color space (e.g., BT.2020, for example UHDTV).

FIG. 3 shows an example comparison between a first color space 310 (e.g., BT.709 (HDTV)) and a second color space 320 (e.g., BT.2020 (UHDTV)). The volume of colors rendered in BT.2020 may be much broader than that in BT.709, which means that more visible color information can be rendered using the UHDTV specification.

One type of scalability is color gamut scalability (e.g., color space scalability). Color gamut scalable (CGS) coding is multi-layer coding where two or more layers may have different color gamuts (e.g., color spaces). For example, as shown in Table 1, in a two-layer scalable system, the base layer may be an HDTV color gamut as defined in BT.709, whereas the enhancement layer may be a UHDTV color gamut as defined in BT.2020. Another color gamut is the P3 color gamut, which may be used in digital cinema applications. The inter-layer process in CGS coding may use color gamut conversion methods to convert the base layer color gamut to an enhancement layer color gamut. After color gamut conversion is applied, the inter layer reference pictures thus generated can be used to predict the enhancement layer pictures with better accuracy.

The model parameters for color gamut conversion may be different for different content, even when the BL color gamut and the EL color gamut are fixed (e.g., BL may be in BT.709 and EL may be in BT.2020). These parameters may depend on the color grading process during post production in content generation, where the colorists may apply different grading parameters to different spaces and to different content, in order to reflect his or her artistic intent. Moreover, the input video for color grading may include high fidelity pictures. However, in a scalable coding system, coding of the BL pictures may introduce quantization noise. With coding structures such as the hierarchical prediction structure, the level of quantization may be adjusted per picture or per group of pictures. The model parameters generated from color grading may not be sufficiently accurate for encoding purposes. It may be more effective for the encoder to compensate for the coding noise by estimating the model parameters dynamically (e.g., on the fly). The encoder may estimate these parameters per picture or per groups of pictures. These model parameters, generated during color grading process and/or by the encoder, may be signaled to the decoder at the sequence and/or picture level, so that the decoder can perform the same color gamut conversion process during inter-layer prediction.

Figure 4A:
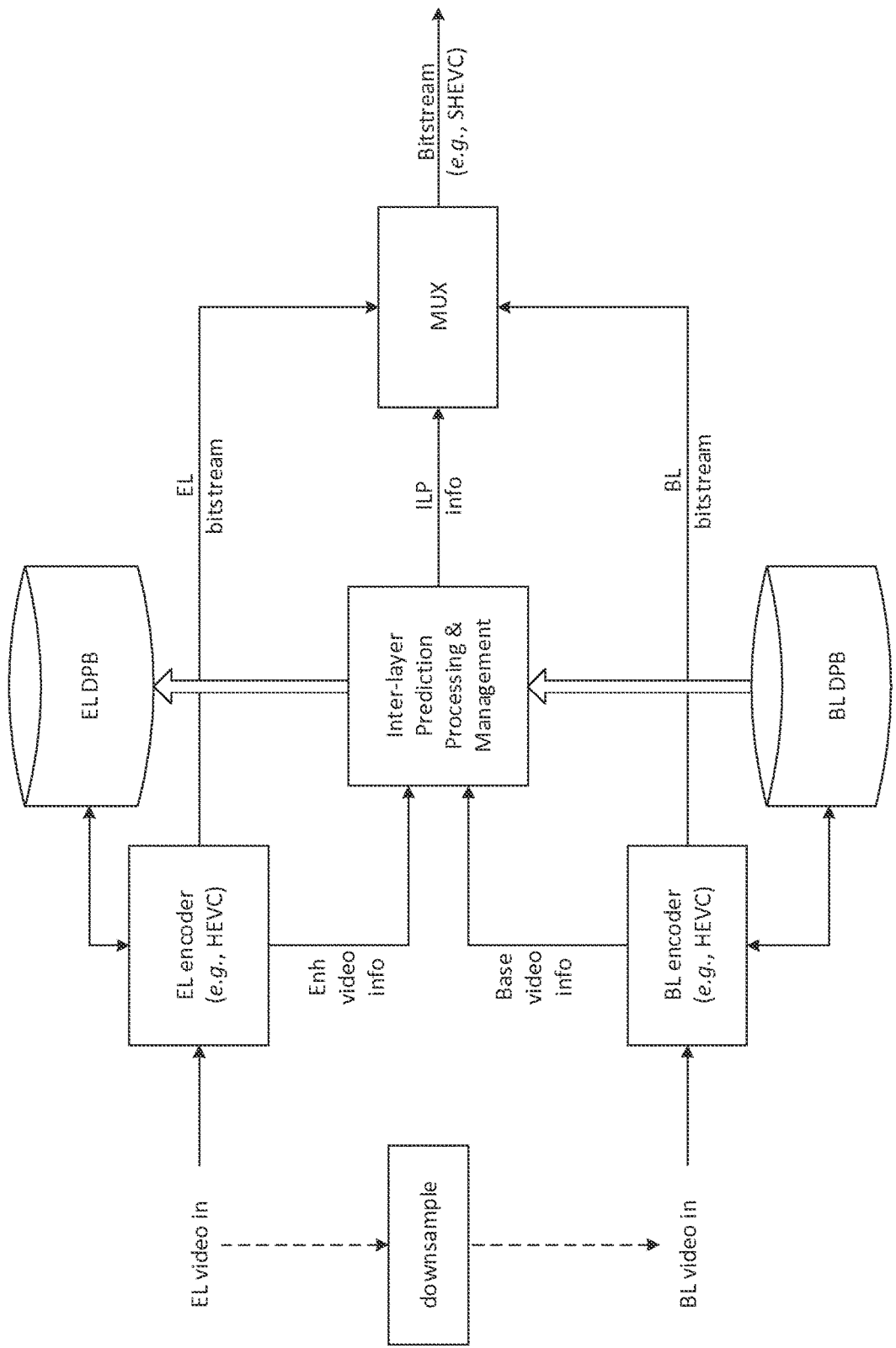
FIG. 4A is a block diagram of an example encoder illustrating an example of color gamut scalability coding with picture level interlayer prediction.

There are various color gamut conversion methods, such as linear or piece-wise linear color gamut conversion. In the film industry, 3D Look-up Tables (LUTs) may be used for color gamut conversion (e.g., color space conversion) from one color gamut (e.g., first color space 310) to another (e.g., second color space 320). FIG. 4A depicts an example encoder that may perform a CGS coding scheme with picture level interlayer prediction (ILP). An ILP system may include color gamut conversion from base layer (BL) color gamut to enhancement layer (EL) color gamut, and/or upsampling from BL spatial resolution to EL spatial resolution, and/or inverse tone mapping from BL sample bit-depth to EL sample bit-depth.

Figure 4B:
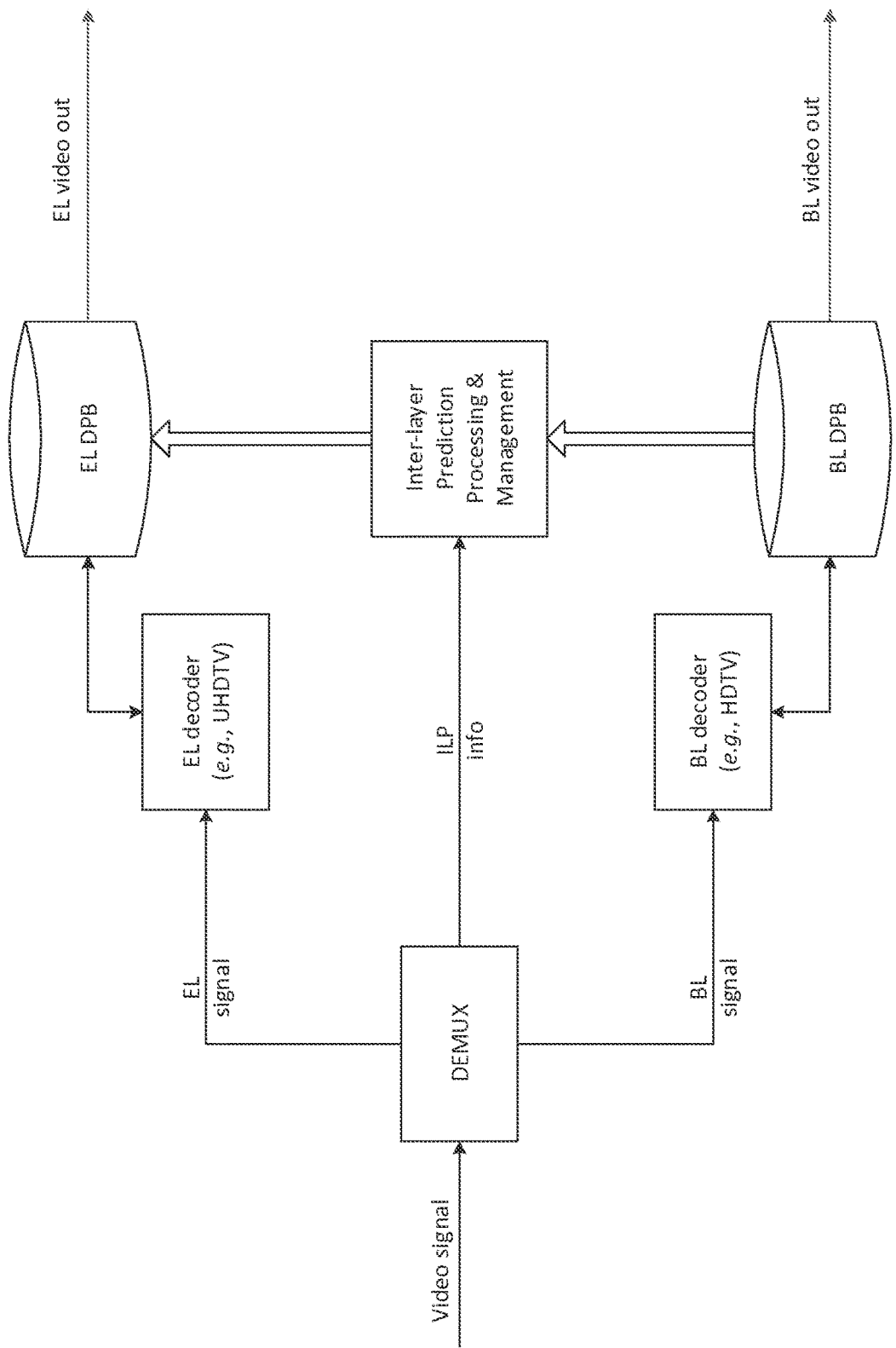
FIG. 4B is a block diagram of an example decoder illustrating an example of color gamut scalability decoding with picture level interlayer prediction.

FIG. 4B depicts an example decoding scheme with ILP. The decoder of FIG. 4B may correspond with the encoder of FIG. 4A. The decoder may perform the operations in reverse of the encoder. For example, a video signal may be de-multiplexed at a demultiplexer (DEMUX) into a base layer signal, an enhancement layer signal, and ILP information. A base layer decoder may decode the base layer signal. The base layer decoder may produce the base layer reconstruction (e.g., BL video out). An ILP processing and management unit may receive ILP information. The ILP processing and management unit may process the base layer reconstruction. This may be done in accordance with the received ILP information. The ILP processing and management unit may selectively insert one or more of the processed base layer pictures into an enhancement layer DPB. This may be done in accordance with the received ILP information. An enhancement layer decoder may decode the enhancement layer signal, for example, with a combination of temporal reference pictures and inter-layer reference pictures (e.g., the processed base layer pictures) to reconstruct the enhancement layer video (e.g., EL video out).

Figure 5:
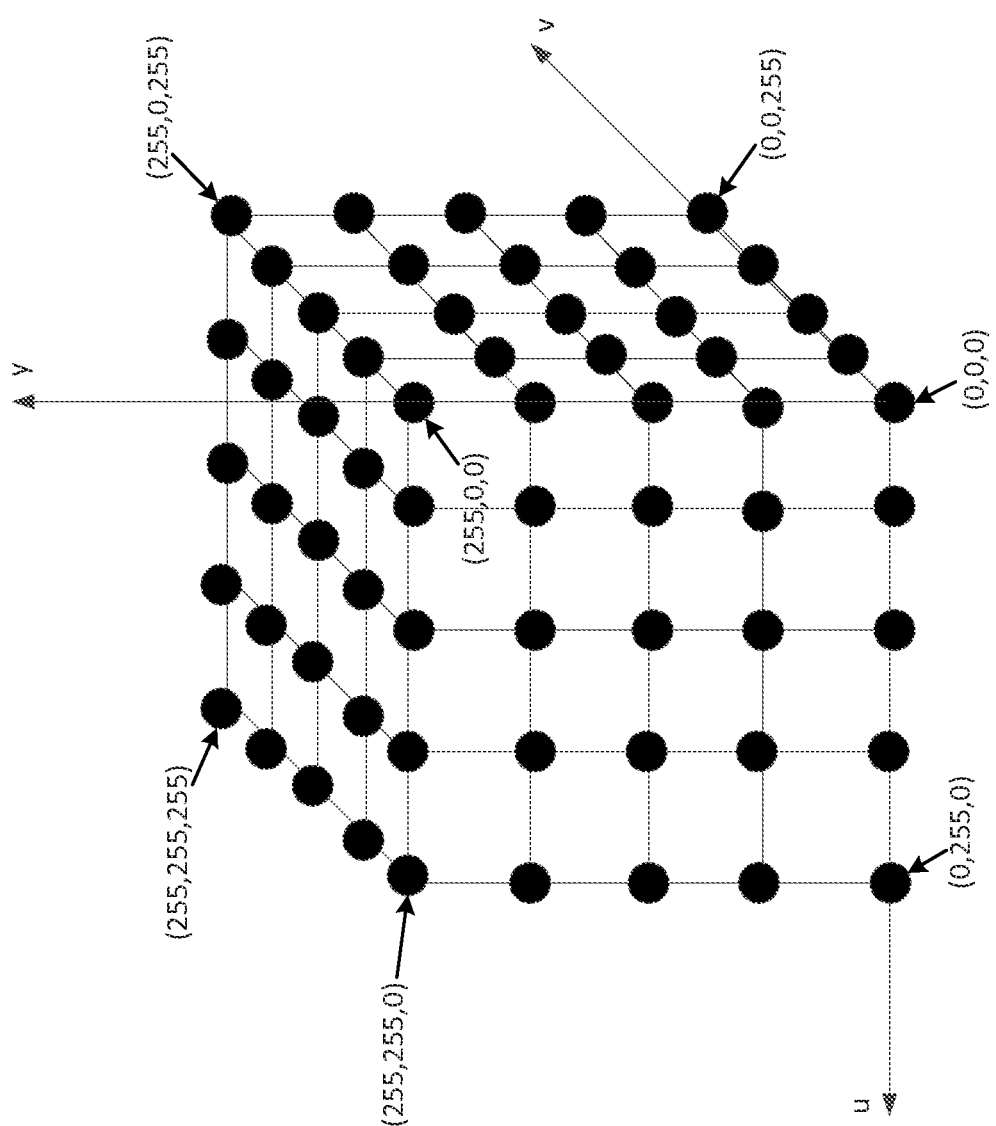
FIG. 5 illustrates an example 3D look-up table (LUT) for an 8-bit YUV signal.

A sample triplet in the color gamut of the base layer (BL), e.g., first color space 310, may be denoted as (y, u, v). A sample triplet in the enhancement layer (EL) color gamut, e.g., second color space 320, may be denoted as (Y, U, V). In a 3D LUT, the entire range of BL color space may be partitioned (e.g., segmented) into a plurality of partitions (e.g., equal octants), for example, as shown in FIG. 5. The partitions shown in FIG. 5 have a dimensionality of three because points in the partitions may be identified by three values, for example a u value, a v value and a y value. In FIG. 5, the input of the 3D LUT may be (y, u, v) in the BL color gamut (e.g., first color space 310), and the output of 3D LUT may be the mapped triplet (Y, U, V) in EL color gamut (e.g., second color space 320). During conversion process, if the input (y, u, v) overlaps with one of the vertices of the partitions (e.g., octants), then the output (Y, U, V) can be derived by referencing one of the 3D LUT entries directly. Otherwise, if the input (y, u, v) lies inside a partition (e.g., an octant), but not on one of its vertices, interpolation may be applied. Trilinear and tetrahedral interpolations are example interpolation methods.

Figure 6:
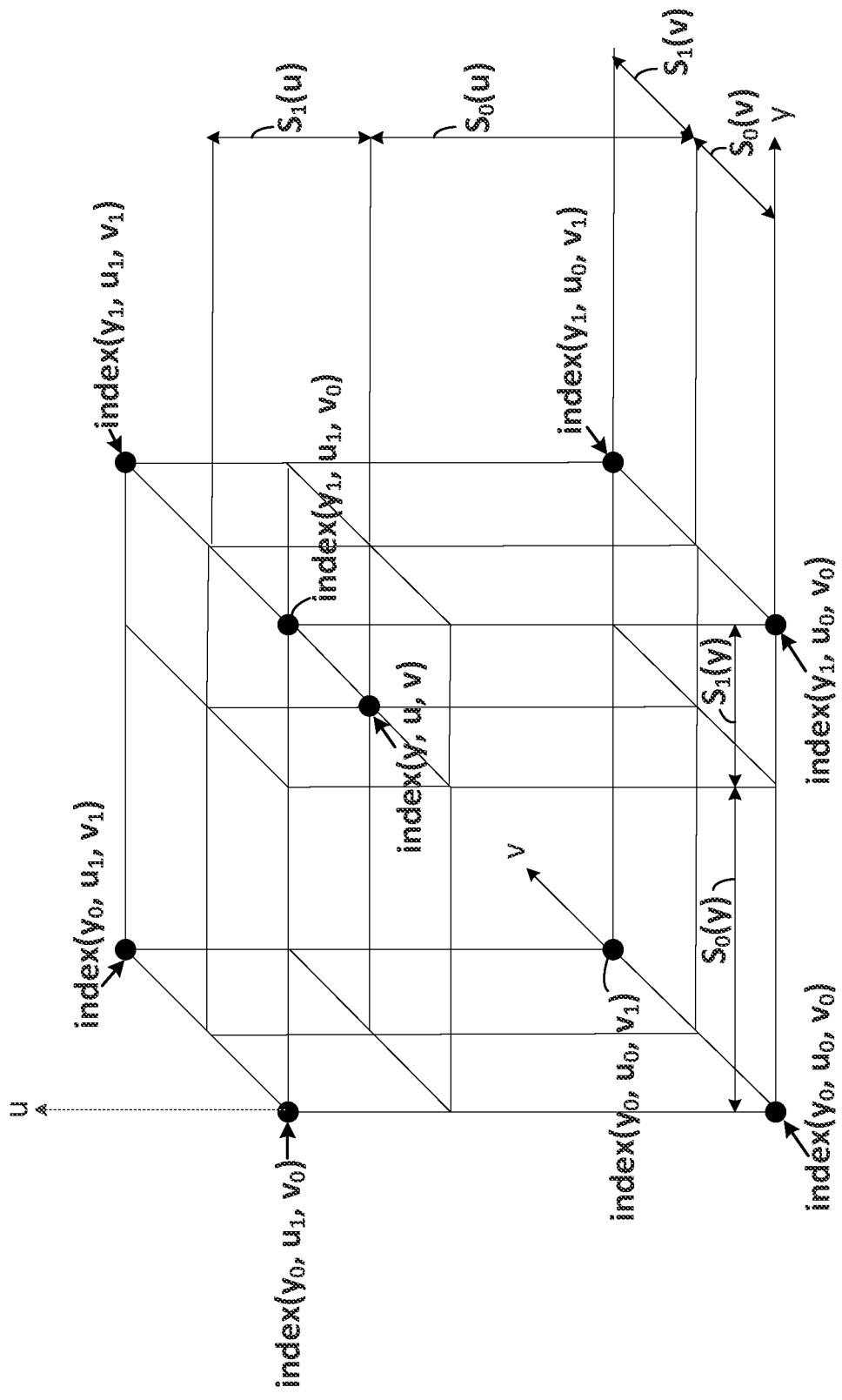
FIG. 6 illustrates an example weight calculation in trilinear or tetrahedral interpolation.

Trilinear interpolation, for example as shown in FIG. 6, may reference its nearest eight vertices. The trilinear interpolation may be carried out using one or more of the following equations:

$$Y = K \times \sum_{i=0,1} \sum_{j=0,1} \sum_{k=0,1} s_i(y) \times s_j(u) \times s_k(v) \times LUT[(y_i, u_j, v_k)] \cdot Y \quad (1)$$

$$U = K \times \sum_{i=0,1} \sum_{j=0,1} \sum_{k=0,1} s_i(y) \times s_j(u) \times s_k(v) \times LUT[(y_i, u_j, v_k)] \cdot U \quad (2)$$

$$V = K \times \sum_{i=0,1} \sum_{j=0,1} \sum_{k=0,1} s_i(y) \times s_j(u) \times s_k(v) \times LUT[(y_i, u_j, v_k)] \cdot V \quad (3)$$

$$K = \frac{1}{(y_1 - y_0) \times (u_1 - u_0) \times (v_1 - v_0)} \quad (4)$$

where $(y_i, u_j, v_k)$ may represent the vertices of the BL color gamut (e.g., inputs to the 3D LUT), $LUT[(y_i, u_j, v_k)]$ may represent the vertices of the EL color gamut (e.g., outputs of the 3D LUT at the entry $(y_i, u_j, v_k)$), $LUT[(y_i, u_j, v_k)].Y$, $LUT[(y_i, u_j, v_k)].U$, and $LUT[(y_i, u_j, v_k)].V$ may be the Y, U, and V components of the vertex $LUT[(y_i, u_j, v_k)]$, respectively, $i,j,k \in \{0, 1\}$, and $s_0(y)=y_1-y$, $s_1(y)=y-y_0$, $s_0(u)=u_1-u$, $s_1(u)=u-u_0$, $s_0(v)=v_1-v$, $s_1(v)=v-v_0$ may be the weights for the y, u, v components, respectively, shown in FIG. 6. Equations (1), (2) and (3) may be an example of a color space conversion model.

A color space conversion model may convert a point in a first color space (e.g., BL color space) to a second color space (e.g., EL color space). The color space conversion model may have a dimensionality. The dimensionality of the color space conversion model may refer to a number of first color space components that the model uses to determine a value of a second color space component. The example color space conversion model defined by equations (1), (2) and (3) has a dimensionality of three, since the model uses three components in the first color space to determine a value of a component in the second color space. For example, equation (1) determines a value of Y, which is a luma component in the second color space, based on values of y, u, and v, which are luma and chroma components in the first color space. The example color space conversion model defined by equations (1), (2) and (3) has the same dimensionality, three, as the partition shown in FIG. 5. A color space conversion model that has the same dimensionality as the partition with which the model corresponds may lead to unnecessary computational complexity.

Figure 7:
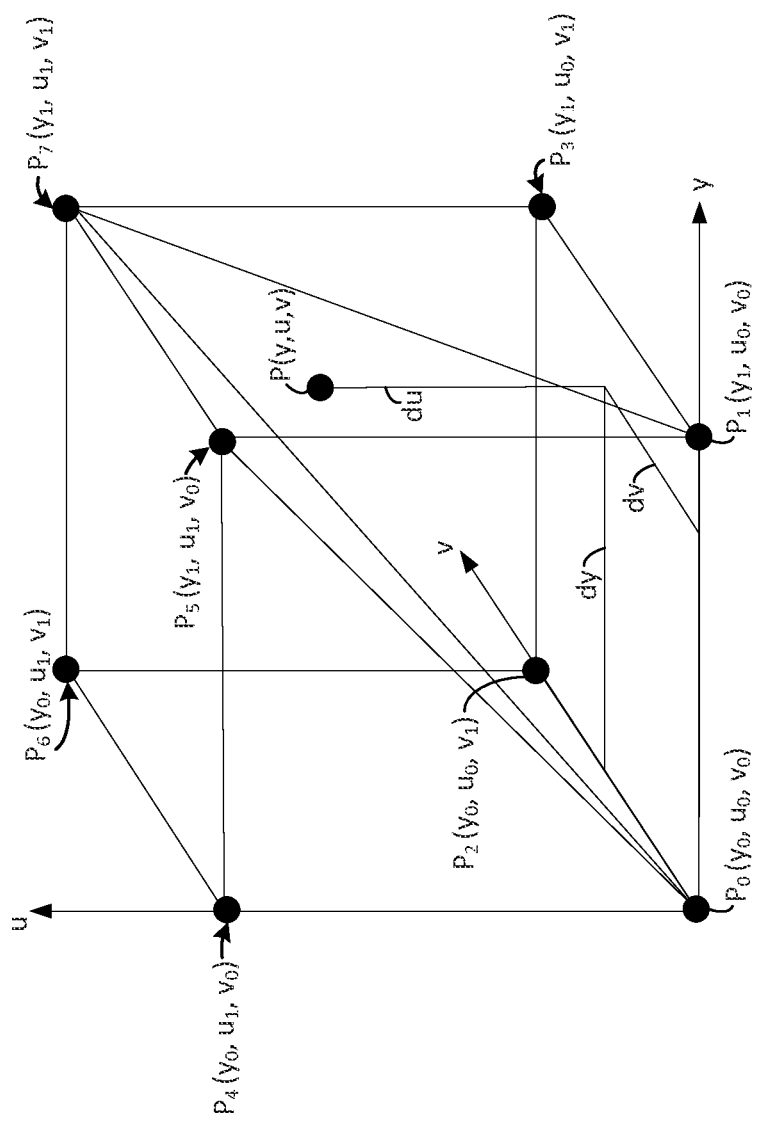
FIG. 7 illustrates an example of tetrahedral interpolation.

Tetrahedral interpolation may use four vertices of a tetrahedron containing the point to be interpolated for calculation. The input point P in FIG. 7 may be enclosed inside the tetrahedron whose vertices are $P_0$, $P_1$, $P_5$, and $P_7$ The tetrahedral interpolation may be calculated, for example, using Equations (5), (6), and (7) below for one or more (e.g., each) component. As shown in FIG. 7, there are six tetrahedrons that may include the point P to be interpolated. The vertices $P_0$ and $P_7$ may be included in the tetrahedron.

$$Y = \qquad (5)$$
$$T_y \times ((y1 - y0) \times LUT[P_0] \cdot Y + dy \times (LUT[P_1] \cdot Y - LUT[P_0] \cdot Y)) +$$
$$T_u \times du \times (LUT[P_5] \cdot Y - LUT[P_1] \cdot Y) +$$
$$T_v \times dv \times (LUT[P_7] \cdot Y - LUT[P_5] \cdot Y)$$

$$U = \qquad (6)$$
$$T_y \times ((y1 - y0) \times LUT[P_0] \cdot U + dy \times (LUT[P_1] \cdot U - LUT[P_0] \cdot U)) +$$
$$T_u \times du \times (LUT[P_5] \cdot U - LUT[P_1] \cdot U) +$$
$$T_v \times dv \times (LUT[P_7] \cdot U - LUT[P_5] \cdot U)$$

$$V = \qquad (7)$$
$$T_y \times ((y1 - y0) \times LUT[P_0] \cdot V + dy \times (LUT[P_1] \cdot V - LUT[P_0] \cdot V)) +$$
$$T_u \times du \times (LUT[P_5] \cdot V - LUT[P_1] \cdot V) +$$
$$T_v \times dv \times (LUT[P_7] \cdot V - LUT[P_5] \cdot V)$$

$$T_y = \frac{1}{(y_1 - y_0)}, T_u = \frac{1}{(u_1 - u_0)}, T_v = \frac{1}{(v_1 - v_0)} \qquad (8)$$

Equations (5), (6), and (7) may be an example of a color space conversion model. The color space conversion model represented by equations (5), (6), and (7) has a dimensionality of three, since values of three components in the first color space may be used to calculate a value of a component in the second color space. For example, equation (5) uses distances dy, du and dv values in the first color space to determine a value of Y in the second color space. The color space conversion model and the partition with which the color space conversion model corresponds have the same dimension. This may lead to computational complexity.

The 3D LUT may be estimated by the encoder, for example, using the original signal in one color space and the corresponding signal in another color space. A least squares (LS) estimation method may be used to estimate an optimal 3D LUT if the 3D LUT interpolation process is linear. Otherwise, a gradient descent based iterative method may be used for estimation. A 3D LUT estimation method may consider statistical characteristics in color gamut conversion. One challenge in color gamut conversion complexity with 3D LUTs (e.g., a model having the same dimensionality as its corresponding partition, for example using a 3D model on a 3D partition) is computation complexity. Even with optimal implementations, tetrahedral interpolation (e.g., Equations (5)-(7)) involves three multiplications. Another challenge is the size of the LUT's, which may be stored in the memory close to the processor for fast access. The memory close to the processor, e.g., L1/L2 cache, may be expensive compared to the main memory. Considering FIG. 5 as an example in which the sample bit depth is 8-bit, if the unit octant size is 32×32×32, there may be 9×9×9 entries in the 3D LUT. Each entry of the 3D LUT may have three components. Such a 3D LUT may store 2187 (e.g., 9×9×9× 3) values for a 9×9×9-sized 3D LUT.

A color space conversion model may use triangular interpolation or linear interpolation, for example to reduce computation complexity. A color space conversion model may have a dimensionality area that is less than a dimensionality of a partition with which the color space conversion model corresponds, for example if the color space conversion model uses triangular interpolation. For example, a partition may have a first dimensionality and the color space conversion model may have a second dimensionality that is less than the first dimensionality. For example, a partition may have a dimensionality of three (e.g., 3D partition) and a color space conversion model corresponding with the partition may have a dimensionality of two or one (e.g., 2D or 1D model). A partition may have a dimensionality of two (e.g., 2D partition) and a color space conversion model corresponding with partition may have a dimensionality of one (e.g., 1D model). A color space conversion model that has a dimensionality of two (e.g., 2D model) may use two components (e.g., only two components) from the first color space to determine a value of a component in the second color space. For example, the color space conversion model may consider two components (e.g., only two components), rather than three components, in weight calculation for the interpolation.

A decoder (e.g., WTRU shown in FIG. 10B) may receive a video signal (e.g., video signal X in FIG. 1). The video signal may be associated with a first color space (e.g., first color space 310). The first color space may include a point (e.g., Point P in FIG. 8). The decoder may determine (e.g., identify) a partition 900 of the first color space that includes the point (e.g., Point P). The decoder may determine the partition 900 by partitioning the first color space into a plurality of partitions and select a partition, from the plurality of partitions, which includes the point P. The partition may be associated with a first dimensionality (e.g., partition may be three-dimensional). For example, the decoder may partition the first color space into three-dimensional partitions. In a three-dimensional partition, the point may be identified by three values, each value corresponding with one of three components that characterize the first color space. The partition that includes the point may be a cube or an octant. The partition may have vertices (e.g., a cube-shaped partition may have eight vertices).

The decoder may convert the point from the first color space to a second color space using a color space conversion model that corresponds with the partition that includes the point. Different color space conversion models may correspond with different partitions. For example, a first color space conversion model may correspond with a first partition and a second color space conversion model may correspond with a second partition. The first color space conversion model may have different color space conversion model parameter(s) from the first color space conversion model. The decoder may receive the color space conversion model, for example in a portion of the received video signal. The color space conversion model may be associated with a second dimensionality that is less than the first dimensionality. For example, the color space conversion model may have a dimensionality of one or two and the partition may have a dimensionality of three. The color space conversion model may have a dimensionality of one and the partition may have a dimensionality of two. A two-dimensional color space conversion model may use values of two components (e.g., only two components, instead of three components) in the first color space to determine a value for one of the two components in the second color space. The point (e.g., Point P in FIG. 8) may comprise a luma value (e.g., y), a first chroma value (e.g., u) and a second aroma value (e.g., v) in the first color space. The color space conversion model may convert the point from the first color space to the second color space by determining a luma value (e.g., Y), a first chroma value (e.g., U) and a second chroma value (e.g., V) for the point in the second color space.

The color space conversion model may determine a component value (e.g., a luma value, for example Y) in the second color space for the point based on predetermined component values in the second color space for other points (e.g., one or more vertices of the partition). The color space conversion model may retrieve the predetermined component values from a memory, for example from a look up table (LUT) that may be stored in the memory. The color space conversion model may use interpolation (e.g., triangular interpolation) to determine the component value. For example, for luma component interpolation, either of the two chroma components, in addition to the luma component itself, may be used. For interpolation of either of the chroma components, the luma component and that chroma component itself may be used. For example, the luma component (e.g., y) and a first chroma component (e.g., v) may be considered for luma interpolation (e.g., in determining Y). The second chroma component (e.g., u) may not be considered for luma interpolation, for example to decrease computation complexity.

Figure 8:
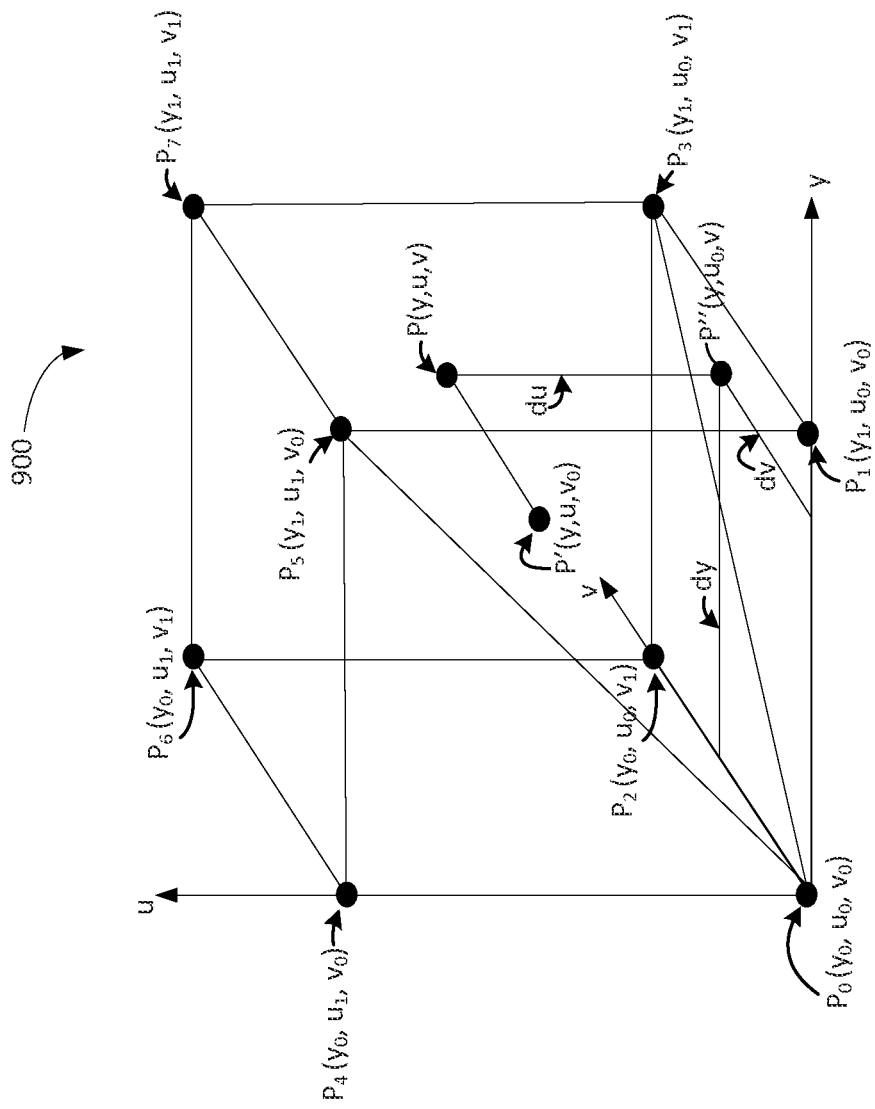
FIG. 8 illustrates an example of triangular interpolation and/or linear interpolation.

Converting the point from the first color space to the second color space may include one or more of the following. The decoder may determine a projection of the point in the partition onto a plane of the partition. The decoder may determine the projection by projecting the point onto the plane. For example, as shown in FIG. 8, the input point P (y,u,v) may be projected onto a plane formed by the y and v components. The plane may be a luma-chroma plane (e.g., y-v plane). The plane may have a first axis (e.g., a luma axis, for example y-axis) and a second axis (e.g., a chroma axis, for example v-axis). The decoder may determine a first distance (e.g., dy) of the projected point (e.g., P''') from the first axis (e.g., y-axis). The decoder may determine a second distance (e.g., dv) of the projected point (e.g., P''') from the second axis (e.g., v-axis). The decoder may determine three other points (e.g., $P_0$, $P_1$, $P_3$) in the partition (e.g., in the plane). For example, the three other points may form a triangle that encloses the projected point P'''. The decoder may determine the three other points by selecting vertices of the partition that form a triangle around the projected point.

For each of the three other points, the decoder may determine a value of a first component in the second color space. For example, the decoder may determine luma values in the second color space for points $P_0$, $P_1$ and $P_3$. The second color space luma values for points $P_0$, $P_1$ and $P_3$ may be stored in a memory (e.g., a LUT). The decoder may determine the second color space luma values at points $P_0$, $P_1$ and $P_3$ by retrieving them from the memory. The decoder may determine a value of the first component in the second color space that corresponds with the point based on the first distance, the second distance and the three values of the first component. For example, the decoder may determine a lama value in the second color space that corresponds with the Point P based on dy, dv and second color space luma values at points $P_0$, $P_1$ and $P_3$. For example, the output luma Y (e.g., second color space luma value for Point P) may be interpolated using Equation 9:

$$Y=T_y\times((y1-y0)\times\text{LUT}[P_0].Y+dy\times(\text{LUT}[P_1].Y-\text{LUT}[P_0].Y))+T_v\times dv\times(\text{LUT}[P_3].Y-\text{LUT}[P_1].Y) \quad (9)$$

In Equation (9), Y may refer to a value of the luma component in the second color space that corresponds with the point. LUT[P0].Y, LUT[P1].Y and LUT[P3].Y may refer to luma values in the second color space at points $P_0$, $P_1$ and $P_3$, respectively. These values may be stored in a memory, for example in a LUT, an array or other data structure. The decoder may determine the output luma Y based on a size of the partition 900. The size may be defined by a distance (e.g., $y_1-y_0$) along a luma axis that lies in the plane. Ty and Tv may be inversely proportion to a size of the partition 900. For example, Ty may be inversely proportional to a size of the partition 900 along a luma axis (e.g., y-axis). Tv may be inversely proportional to a size of the partition 900 along a chroma axis (e.g., v-axis). For example, Ty may be calculated as $1/(y_1-y_0)$ and Tv may be calculated as $1/(v_1-V_0)$.

Converting the point from the first color space to the second color space may include determining a value of a second component, in the second color space, that corresponds with the point. For example, determining a value of a chroma component (e.g., chroma U) in the second color space for point P. To determine output chroma U using triangular interpolation, the point P may be projected onto a second plane. For example, the point P may be projected onto the plane formed by the y and u components (e.g., y-u plane). The second plane may have a luma axis (e.g., y-axis) and a chroma axis (e.g., u-axis). The second plane may have a first chroma axis (e.g., u-axis) and a second chroma axis (e.g., v-axis). The chroma value in the second color space for point P may be determined by interpolating second color space chroma values for three other points. The three points may lie in the second plane. The three points may be vertices of the partition 900. Some points selected in determining the chroma value may overlap with the points selected in determining the luma value. For example, the projection point P' may be enclosed inside the triangle ($P_0$, $P_1$, $P_5$). The decoder may select points $P_0$, $P_1$ and $P_5$ as the three points used in determining output chroma U at point P. The points $P_0$, $P_1$ and $P_5$ lie in a plane defined by the points $P_0$, $P_1$ and $P_5$. The interpolation may be calculated with the triangle ($P_0$, $P_1$, $P_5$) as:

$$U=T_y\times((y1-y0)\times\text{LUT}[P_0].U+dy\times(\text{LUT}[P_1].U-\text{LUT}[P_0].U))+T_u\times du\times(\text{LUT}[P_5].U-\text{LUT}[P_1].U) \quad (10)$$

U may refer to a chroma value in the second color space for the point P. LUT[P0].U, LUT[P1].U and LUT[P5].U may refer to second color space chroma values at points $P_0$, $P_1$ and $P_5$, respectively. The second color space chroma values for points $P_0$, $P_1$ and $P_5$ may be stored in a memory (e.g., a LUT). The decoder may retrieve the second color space chroma values for points $P_0$, $P_1$ and $P_5$ from the memory. The decoder may determine the second color space chroma value U for point P using triangular interpolation, for example using equation (10).

Converting the point from the first color space to the second color space may include determining a second color space value of a third component for the point. The third component may be a second chroma component, for example chroma V. To interpolate the second color space value of the third component, the point may be projected onto a plane formed by the first component and the third component. For example, for output chroma V using triangular interpolation, point P may be projected to a plane formed by the y and v components. The plane may have a first axis that corresponds with the first component. For example, the plane may have a luma axis that corresponds with the luma component (e.g., a y-axis that corresponds with luma y). The plane may have a second axis that corresponds with the second component. For example, the plane may have a chroma axis that corresponds with the chroma component (e.g., a v-axis that corresponds with chroma v). The decoder may select three other points that may be used for triangular interpolation. For example, the projection point P''' may be enclosed inside the triangle ($P_0$, $P_1$, $P_3$) The decoder may select points $P_0$, $P_1$ and $P_3$ as the three points that may be used for triangular interpolation. The interpolation may be calculated with the triangle ($P_0$, $P_1$, $P_3$) as:

$$V=T_y\times((y1-y0)\times \text{LUT}[P_0].V+dy\times(\text{LUT}[P_1].V-\text{LUT}[P_0].V))+T_v\times dv\times(\text{LUT}[P_3].V-\text{LUT}[P_1].V) \quad (11)$$

In equation (11), V may refer to a value of a third component in the second color space at the point. For example, V may refer to a second color space value of the second chroma component. LUT[P0].V, LUT[P1].V and LUT[P3].V may refer to second color space values of the second component at the points $P_0$, $P_1$ and $P_3$, respectively. For example, LUT[P0].V, V LUT[P1].V and LUT[P3].V may refer to second color space values of the second chroma component at the points $P_0$, $P_1$ and $P_3$, respectively. LUT[P0].V, LUT[P1].V and LUT[P3].V may be store in a memory (e.g., a LUT). The decoder may retrieve the values from the memory. The decoder may determine a distance of the projected point P''' along an axis of the third component. For example, the decoder may determine a distance dv of the projection point P''' along the v-axis. The decoder may use the distance dv in determining the value of the third component, for example as shown in equation (11). Tv may be inversely proportional to a size of the partition 900. For example, Tv may be determined as 1/($v_1-v_0$).

Compared to tetrahedral interpolation (e.g., Equations (5)-(7)), the number of multiplications of triangular interpolation may be reduced.

Linear interpolation may be used, for example to further reduce computation complexity. Linear interpolation may include one or more of the following. Equations 12, 13 and/or 14 define a color space conversion model that has a dimensionality of one. Using a one-dimensional color space conversion model (e.g., the model defined by equations 12, 13 and 14) may reduce the computational complexity in color gamut conversion. For linear interpolation, a point may be projected onto an axis that corresponds with the component that is being determined. For example, for linear interpolation, the base layer point may be projected to y and/or v axis. As shown in FIG. 8, for lama Y linear interpolation, the input point P may be projected to the y axis. The projection of the input point P may be inside a line section defined by two other points (e.g., $P_0$, $P_1$). The linear interpolation for Y may be calculated as:

$$Y=T_y\times((y1-y0)\times \text{LUT}[P_0].Y+dy\times(\text{LUT}[P_1].Y-\text{LUT}[P_0].Y)) \quad (12)$$

Y may refer to a second color space value of a first component at the input point P. For example, Y may refer to a second color space luma value at the input point P. LUT[P0].Y and LUT[P1].Y may refer to second color space values of the first component at points $P_0$ and $P_1$, respectively. For example, LUT[P0].Y and LUT[P1].Y may refer to second color space values of the luma component at points $P_0$ and $P_1$, respectively. LUT[P0].Y and LUT[P1].Y may be stored in a memory (e.g., a LUT). The decoder may determine the second color space value of the first component based on a length of the line section defined by points $P_0$ and $P_1$. For example, equation 12 uses ($y_1-y_0$). Equation 12 is part of a color space conversion model that has a dimensionality of one because equation 12 only uses y values and not u or v values.

Determining a second color space value for a second component at the point may include one or more of the following. The second component may include a first chroma component, for example chroma U. The input point may be projected onto an axis corresponding with the second component. For example, for chroma U interpolation, the input point P may be projected to the u axis. The projection of the point P may be inside a line section defined by two other points (e.g., a line section defined by point $P_0$, and $P_4$). The linear interpolation for the second component (e.g., chroma U) may be calculated as:

$$U=T_u\times((u1-u0)\times \text{LUT}[P_0].U+du\times(\text{LUT}[P_4].U-\text{LUT}[P_0].U)) \quad (13)$$

U may refer to a second color space value of the second component at the point P. For example, U may refer to the second color space value of a first chroma component, for example chroma U. LUT[P0].U and LUT[P4].U may refer to second color space values of the second component at the points $P_0$ and $P_4$, respectively. For example, LUT[P0].U and LUT[P4].U may refer to second color space values of chroma U at points $P_0$ and $P_4$, respectively. LUT[P0].U and LUT[P4].U may be stored in a memory (e.g., a LUT). The decoder may retrieve LUT[P0].U and LUT[P4].U from the memory. The decoder may determine the second color space value of the second component based on a size of the partition. For example, equation 13 uses ($u_1-u_0$), which may be a distance between the points $P_0$ and $P_4$ that define the line section on which the projection lies. To may be inversely proportional to the distance of the line section. Tu may be determined using 1/($u_1-u_0$).

Determining a second color space value of a third component may include one or more of the following. The input point P may be projected onto an axis that corresponds with the third component. For example, the third component may include a second chroma component (e.g., chroma V). For chroma V interpolation, the input point P may be projected onto the v axis. The projection may be inside a line section defined by two other points (e.g., points $P_0$, and P2). Points $P_0$ and $P_2$ may be selected as two other points that may be used in the linear interpolation. The linear interpolation for V may be calculated as:

$$V=T_v\times((v1-v0)\times \text{LUT}[P_0].V+dv\times(\text{LUT}[P_2].V-\text{LUT}[P_0].V)) \quad (14)$$

V may refer to the second color space value of the third component. For example, V may refer to the second color space value of the second chroma component (e.g., chroma V). LUT[P0].V and LUT[P2].V may refer to second color space values of the third component at points $P_0$ and $P_2$, respectively. For example, LUT[P0].V and LUT[P2].V may refer to second color space values of the second chroma components at the points $P_0$ and $P_2$, respectively. LUT[P0].V and LUT[P2],V may be stored in a memory (e.g., a LUT). The decoder may determine a distance dv of the projection along an axis that corresponds with the third component. For example, dv may be the distance of the projection from point $P_0$ along the v axis. The decoder may determine a size of the partition along an axis that corresponds with the third component (e.g., $v_1 - v_0$). Tv may refer to a constant that may be inversely proportional to the size of the partition. For example, Tv may be determined using $1/(v_1 - v_0)$.

Compared to triangular interpolation and using a color space conversion model with a dimensionality of two (e.g., Equations (9)-(11)), the number of multiplications may be further reduced with linear interpolation and using a color space conversion model with a dimensionality of one (e.g., Equations (12)-(14)).

Triangular and linear interpolation may be applied in any of a number of ways. One way is to apply interpolation to the same 3D LUT coding by replacing the tetrahedral interpolation or trilinear interpolation with the triangular (e.g., Equations (9)-(11)) or linear interpolation (e.g., Equations (12)-(14)). In this case, the LUT coding may remain the same as tetrahedral interpolation based 3D LUT, and computation complexity may be reduced.

Triangular or linear interpolation may be applied by using triangular interpolation in combination with a 2D LUT and by using linear interpolation in combination with a 1D LUT. In this way, both computation complexity and the size of the LUT can be reduced. For example, if the distance of nearest neighboring vertices is 32 for 8-bit input video, the 3D LUT size may be 2187 (e.g., 9×9×9×3) for 3 components. The 2D LUT size for three components may be 243 (e.g., 9×9×3), and the 1D LUT size for three components may be 27 (e.g., 9×3). The size of a LUT may be reduced when the dimension of the LUT is reduced.

LUT parameters may be estimated by changing the weight calculations according to Equations (9)-(11) for triangular interpolation and Equations (12)-(14) for linear interpolation. The range of estimated LUT parameters may be outside the range of the target video in the enhancement layer. For example, if the target video is 10-bit, the estimated LUT parameters may be negative or larger than 2047, which may involve using more than ten bits to store each component entry. In order to save the storage space of LUT, the estimated LUT parameters can be clipped back to the normal dynamic range of the target video, with slightly reduced color gamut conversion accuracy. For example, if the target video is 10-bit, the estimated LUT parameters can be clipped to the range of [0, 2047] such that LUT entries can be stored using ten bits.

One- and two-dimensional LUTs can be incorporated into signaling of color gamut conversion. Table 2 illustrates an example extended syntax description for combined color gamut conversion. Table 3 is an example LUT syntax table. The LUT may not be defined in the full bit depth range, and the data range of each component of the LUT may be signaled. For example, the full bit depth range of each component for 8-bit video may be [0, 255]. However, the dynamic range of actual video may be a part of this range. Using a LUT defined in the smaller data range may improve the accuracy with the same LUT size. Those pixels outside the data range defined for a 3D LUT can be approximated with the nearest neighboring pixels inside the data range or can be processed with another color gamut conversion method, such as, for example, gain offset, cross component linear, or piecewise linear.

TABLE 2

Example syntax table for combined color gamut coversion

| | |
|---|---|
| Model_parameters_combined_scalability ( ) { | Descriptor |
|   bit_depth_input_luma_minus8 | u(4) |
|   bit_depth_input_chroma_delta | ue(v) |
|   bit_depth_output_luma_delta | ue(v) |
|   bit_depth_output_chroma_delta | ue(v) |
|   CGS_method | u(v) |
|   if(CGS_method == linear_with_gain_offset) | |
|     gain_and_offset( ) | |
|   else if(CGS_method == linear_with_cross_component) | |
|     cross_component_linear( ) | |
|   else if(CGS_method == piecewise_linear) | |
|     piecewise_linear( ) | |
|   else if(CGS_method == LUT) | |
|     LUT( ) | |
| Else | |
|   customized_CGS_parameters( ) | |
| } | |

TABLE 3

Example LUT syntax table

| | |
|---|---|
| LUT ( ) { | Descriptor |
|   for( comp=0; comp<3 comp++) { | |
|     min_value_comp | u(v) |
|     max_value_comp | u(v) |
|   } | |
|   LUT_type | u(2) |
|   if ( LUT_type == 3D_LUT ) | |
|     3D_LUT( ) | |
|   else if (LUT_type == 2D_LUT ) { | |
|     prediction_mode | u(2) |
|     LUT_precision_luma_minus1 | ue(v) |
|     LUT_precision_chroma_minus1 | ue(v) |
|     for (comp =0; comp<3; comp++) { | |
|       if( comp == 0) | |
|         UV_component_used | u(1) |
|       2D_LUT(comp) | |
|     } | |
|   } | |
|   else if (LUT_type == 1D_LUT ) { | |
|     prediction_mode | u(2) |
|     LUT_precision_luma_minus1 | ue(v) |
|     LUT_precision_chroma_minus1 | ue(v) |
|     for( comp =0; comp <3; comp++) { | |
|       1D_LUT( comp ) | |
|     } | |
|   } | |
| } | | in Table 3, the value min_value_comp may indicate the minimum value of the component comp. The value max_value_comp may indicate the maximum value of the component comp. The input data range of the component comp may be defined in the LUT to belong to the range [min_value_comp, max_value_comp].

A value LUT_type may be provided and/or used to indicate the type of LUT. The LUT_type may be, for example, 3D LUT, 2D LUT, or 1D LUT. For a 3D LUT, there may be one LUT. For a 2D LUT or a 1D LUT, there may be a LUT for each component (e.g., Y, U, and V).

The value UV_component_used may be provided and/or used to indicate whether interpolation of the luma component depends on the chroma u component or the chroma v component.

The prediction_mode may include one or more (e.g., three) possible prediction modes for the octree coding. The parent octant from the current 3D LUT may be used as the prediction to code each of its child octants, for example, if the prediction_mode is 0. The prediction value for each child octant/vertex may be generated from its parent octant with trilinear interpolation. The existing global 3D LUT may be used as prediction to code the current 3D LUT and the prediction for each vertex may be generated from the collocated vertex in the existing global 3D LUT (e.g., the collocated vertex may be interpolated, if not existing), for example, if the prediction_mode is 1. The current 3D LUT and the existing global 3D LUT may be used as predictions and the prediction used for each octant/vertex coding may be signaled for each octant/vertex separately, for example, if the prediction_mode is 2.

The value LUT_precision_luma_minus1 may be provided and/or used. LUT_precision_luma_minus1+1) may be a precision parameter used to code the difference between the LUT parameter to be coded and its prediction for the luma (Y) component.

The value LUT_precision_chroma_minus1 may be provided and/or used. The LUT_precision_chroma_minus1+1 may be the precision parameter used to code the difference between the LUT parameter and its prediction for the chroma (U, V) component. It can different from that for luma signal.

As discussed herein, LUT_precision_luma_minus1 and LUT_precision_chroma_minus1 may be used for a LUT parameter decoding process. Smaller values of these precision parameters may make 3D LUT more accurate and reduce the distortion of color gamut conversion. Additionally, smaller values may increase the number of coding bits. Therefore, the appropriate values of these precision parameters may be determined by rate-distortion optimization (RDO).

Tables 4 and 5 illustrate example syntax elements for 2D LUT coding. A 2D LUT and a 1D LUT may be recursively coded. FIG. 9 illustrates an example quadtree splitting structure 1000 for 2D LUT coding. 1D LUT coding may use a binary tree structure.

TABLE 4

Example of syntax of the 2D LUT coding

| | Descriptor |
|---|---|
| 2D_LUT ( comp ) { | |
|   num_layers_minus1 | u(3) |
|   coding_square (comp, 0, | |
|   min_value_luma,min_value_comp) | |
| } | |

TABLE 5

Example of syntax elements for coding_square( )

| | Descriptor |
|---|---|
| coding_square (comp, layer, y,x) { | |
|   for( i = 0; i<4 ; i++ ) { | |
|     n = getVertex2D(y, x, i) | |
|     if (!coded_flag[n]) { | |
|       if (prediction_mode == 2) | |
|         vertex_prediction_mode | u(1) |
|       nonzero_residual_flag | u(1) |
|       if (nonzero_residual_flag) { | |
|         delta_comp | se(v) |
|       } | |
|       coded_flag[n] = true | |
|     } | |
|   } | |
| } | |

TABLE 5-continued

Example of syntax elements for coding_square( )

| | |
|---|---|
| square_split_flag | u(1) |
| if (square_split_flag) { | |
|   for( i = 0; i<4 ; i++ ) { | |
|     coding_square ( comp, layer+1, y+dy[i],x+dx[i]) | |
|   } | |
| } | |
| } | |

In Table 5, y may be the coordinate of the luma component, and x may be the coordinate of either the u or v component. If the component comp indicates the LUT for luma, then x may be u or v, for example, depending on the value of UV_component_used. If the component comp indicates the LUT for chroma, then x may be the chroma component indicated by the component comp. The syntax element delta_comp may be the quantized residual of the specific component comp. Example values of dy[i], dx[i] in Table 5 may be shown in Table 6.

TABLE 6

Example definitions of dy, dx

| i | dy[i] | dx[i] |
|---|---|---|
| 0 | 0 | 0 |
| 1 | 0 | (max_value_comp+1-min_value_comp)>>(1+layer) |
| 2 | (max_value_luma+1-min_value_luma)>>(1+layer) | 0 |
| 3 | (max_value_luma+1-min_value_luma)>>(1+layer) | (max_value_comp+1-min_value_comp)>>(1+layer) |

A function getVertex2D(y, x, i) may be used to derive the vertex index of the square whose first vertex is located at (y, x). The function getVertex2D(y, x, i) may be evaluated according to the following pseudocode;

```
getVertex2D(y, x, i)  {
  get dy[i], dx[i] using Table 6 depending on the value of i;
  square_len_y = max_value_luma+1 - min_value_luma >>
    num_layers_minus_1;
  square_len_x = (max_value_comp+1 - min_value_comp) >>
    num_layers_minus_1;
  size_in_vertices = 1 + (1<<num_layers_minus_1);
  n = ((y + dy[i]<<1) - min_value_luma/square_len_y)*size_in_vertices +
    ((x + dx[i]<<1) - min_value_comp)/square_len_x);
  return n;
}
```

Tables 7 and 8 illustrate example syntax elements for 1D LUT coding.

TABLE 7

Example syntax of the 1.0 LUT coding

| | Descriptor |
|---|---|
| 1D_LUT ( comp ) { | |
|   num_layers_minus1 | u(3) |
|   coding_section(comp, 0, min_value_comp) | |
| } | |

TABLE 8

Example syntax elements for coding_section( )

| | Descriptor |
|---|---|
| coding_section ( comp, layer, x ) { | |
|   for( i = 0; i<2 ; i++ ) { | |
|     n = getVertex1D(x, i) | |
|     if (!coded_flag[n]) { | |
|       if (prediction_mode == 2) | |
|         vertex_prediction_mode | u(1) |
|       nonzero_residual_flag | u(1) |
|       if (nonzero_residual_flag) { | |
|         delta_comp | se(v) |
|       } | |
|       coded_flag[n] = true | |
|     } | |
|   } | |
|   section_split_flag | u(1) |
|   if (section_split_flag ) { | |
|     for( i = 0; i<2 ; i++ ) { | |
|       coding_section ( comp, layer+1, x+dx[i]) | |
|     } | |
|   } | |
| } | |

In Table 8, x may be the coordinate of the component comp, which may indicate y, u, or v. Example values of dx[i] in Table 8 may be shown in Table 9.

TABLE 9

Example definitions of dx

| i | dx[i] |
|---|---|
| 0 | 0 |
| 1 | (max_value_comp+1-min_value_comp)>>(1+layer) |

A function getVertex1D(x, i) may be used to derive the vertex index of the line section whose first vertex is located at (x). The function getVertex1D(x, may be evaluated according to the following pseudocode;

```
getVertex1D(x, i)  {
  get dx[i] using Table 9 depending on the value of i;
  line_len_x = (max_value_comp+1 - min_value_comp) >>
    num_layers_minus_1;
  size_in_vertices = 1 + (1 << num_layers_minus_1);
  n = ((x + (dx[i] << 1) - min_value_comp) / line_len_x);
  return n;
}
```

It will be appreciated that, while Tables 3-9 are disclosed in the context of the color components (e.g., Y, U, and V) using the same type of LUT (e.g., 3D LUT, 2D LUT, or 1D LUT), some of the color components may use one type of LUT, while other color components may use another type of LUT. For example, the two chroma components may use 2D LUTs, while the luma component may use a 3D LUT.

Figure 10A:
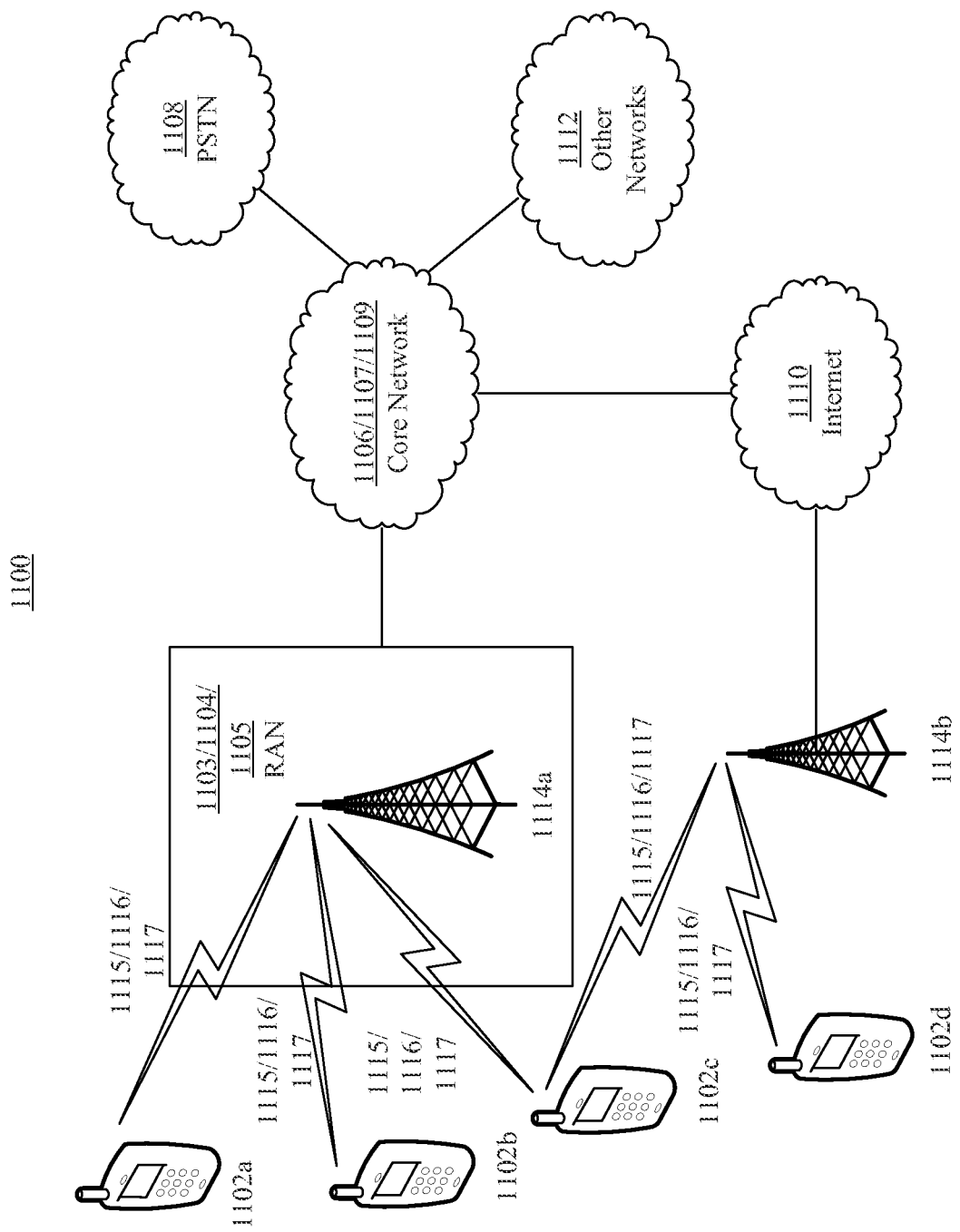
FIG. 10A is a system diagram of an example communications system in which one or more disclosed embodiments may be implemented.

FIG. 10A is a diagram of an example communications system 1100 in which one or more disclosed embodiments may be implemented. The communications system 1100 may be a multiple access system that provides content, such as voice, data, video, messaging, broadcast, etc., to multiple wireless users. The communications system 1100 may enable multiple wireless users to access such content through the sharing of system resources, including wireless bandwidth. For example, the communications system 1100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 10A, the communications system 1100 may include wireless transmit/receive units (WTRUs) 1102a, 1102b, 1102c, and/or 1102d (which generally or collectively may be referred to as WTRU 1102), a radio access network (RAN) 1103/1104/1105, a core network 1106/1107/1109, a public switched telephone network (PSTN) 1108, the Internet 1110, and other networks 1112, though it will be appreciated that the disclosed embodiments contemplate any number of WTRUs, base stations, networks, and/or network elements. Each of the WTRUs 1102a, 1102b, 1102c, 1102d may be any type of device configured to operate and/or communicate in a wireless environment. By way of example, the WTRUs 1102a, 1102b, 1102c, 1102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 1100 may also include a base station 1114a and a base station 1114b. Each of the base stations 1114a, 1114b may be any type of device configured to wirelessly interface with at least one of the WTRUs 1102a, 1102b, 1102c, 1102d to facilitate access to one or more communication networks, such as the core network 1106/1107/1109, the Internet 1110, and/or the networks 1112. By way of example, the base stations 1114a, 1114b may be a base transceiver station (BTS), a Node-B, an eNode B, a Home Node B, a Home eNode B, a site controller, an access point (AP), a wireless router, and the like. While the base stations 1114a, 1114b are each depicted as a single element, it will be appreciated that the base stations 1114a, 1114b may include any number of interconnected base stations and/or network elements.

The base station 1114a may be part of the RAN 1103/1104/1105, which may also include other base stations and/or network elements (not shown), such as a base station controller (BSC), a radio network controller (RNC), relay nodes, etc. The base station 1114a and/or the base station 1114b may be configured to transmit and/or receive wireless signals within a particular geographic region, which may be referred to as a cell (not shown). The cell may further be divided into cell sectors. For example, the cell associated with the base station 1114a may be divided into three sectors. Thus, in one embodiment, the base station 1114a may include three transceivers, e.g., one for each sector of the cell. In another embodiment, the base station 1114a may employ multiple-input multiple output (MIMO) technology and, therefore, may utilize multiple transceivers for each sector of the cell.

The base stations 1114a, 1114b may communicate with one or more of the WTRUs 1102a, 1102b, 1102c, 1102d over an air interface 1115/1116/1117, which may be any suitable wireless communication link (e.g., radio frequency (RF), microwave, infrared (IR), ultraviolet (UV), visible light, etc.). The air interface 1115/1116/1117 may be established using any suitable radio access technology (RAT).

More specifically, as noted above, the communications system 1100 may be a multiple access system and may employ one or more channel access schemes, such as CDMA, TDMA, OFDMA, SC-FDMA, and the like. For example, the base station 1114a in the RAN 1103/1104/1105 and the WTRUs 1102a, 1102b, 1102c may implement a radio technology such as Universal Mobile Telecommunications System (UMTS) Terrestrial Radio Access (UTRA), which may establish the air interface 1115/1116/1117 using wideband CDMA (WCDMA). WCDMA may include communication protocols such as High-Speed Packet Access (HSPA) and/or Evolved HSPA (FISPA+). HSPA may include High-Speed Downlink Packet Access (HSDPA) and/or High-Speed Uplink Packet Access (HSUPA).

In another embodiment, the base station 1114a and the WTRUs 1102a, 1102b, 1102c may implement a radio technology such as Evolved UNITS Terrestrial Radio Access (E-UTRA), which may establish the air interface 1115/1116/1117 using Long Term Evolution (LTE) and/or LTE-Advanced (LTE-A).

In other embodiments, the base station 1114a and the WTRUs 1102a, 1102b, 1102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1114b in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1114b and the WTRUs 1102c, 1102d may implement a radio technology such as IEEE 802.11 to establish a wireless local area network (WLAN). In another embodiment, the base station 1114b and the WTRUs 1102c, 1102d may implement a radio technology such as IEEE 802.15 to establish a wireless personal area network (WPAN). In yet another embodiment, the base station 1114b and the WTRUs 1102c, 1102d may utilize a cellular-based RAT (e.g., WCDMA, CDMA2000, GSM, LTE, LTE-A, etc.) to establish a picocell or ferntocell. As shown in FIG. 10A, the base station 1114b may have a direct connection to the Internet 1110. Thus, the base station 1114b may not be required to access Internet 1110 via the core network 1106/1107/1109.

The RAN 1103/1104/1105 may be in communication with the core network 1106/1107/1109, which may be any type of network configured to provide voice, data, applications, and/or voice over internet protocol (VoIP) services to one or more of the WTRUs 1102a, 1102b, 1102c, 1102d. For example, the core network 1106/1107/1109 may provide call control, billing services, mobile location-based services, pre-paid calling, Internet connectivity, video distribution, etc., and/or perform high-level security functions, such as user authentication. Although not shown in FIG. 10A, it will be appreciated that the RAN 1103/1104/1105 and/or the core network 1106/1107/1109 may be in direct or indirect communication with other RANs that employ the same RAT as the RAN 1103/1104/1105 or a different RAT. For example, in addition to being connected to the RAN 1103/1104/1105, which may be utilizing an E-UTRA radio technology, the core network 1106/1107/1109 may also be in communication with another RAN (not shown) employing a GSM radio technology.

The core network 1106/1107/1109 may also serve as a gateway for the WTRUs 1102a, 1102b, 1102c, 1102d to access the PSTN 1108, the Internet 1110, and/or other networks 1112. The PSTN 1108 may include circuit-switched telephone networks that provide plain old telephone service (POTS), The Internet 1110 may include a global system of interconnected computer networks and devices that use common communication protocols, such as the transmission control protocol (TCP), user datagram protocol (UDP) and the internet protocol (IP) in the TCP/IP interact protocol suite. The networks 1112 may include wired or wireless communications networks owned and/or operated by other service providers. For example, the networks 1112 may include another core network connected to one or more RANs, which may employ the same RAT as the RAN 1103/1104/1105 or a different RAT.

Some or all of the WTRUs 1102a, 1102b, 1102c, 1102d in the communications system 1100 may include multi-mode capabilities, e.g., the WTRUs 1102a, 1102b, 1102c, 1102d may include multiple transceivers for communicating with different wireless networks over different wireless links. For example, the WTRU 1102c shown in FIG. 10A may be configured to communicate with the base station 1114a, which may employ a cellular-based radio technology, and with the has station 1114b, which may employ an IEEE, 802 radio technology.

Figure 10B:
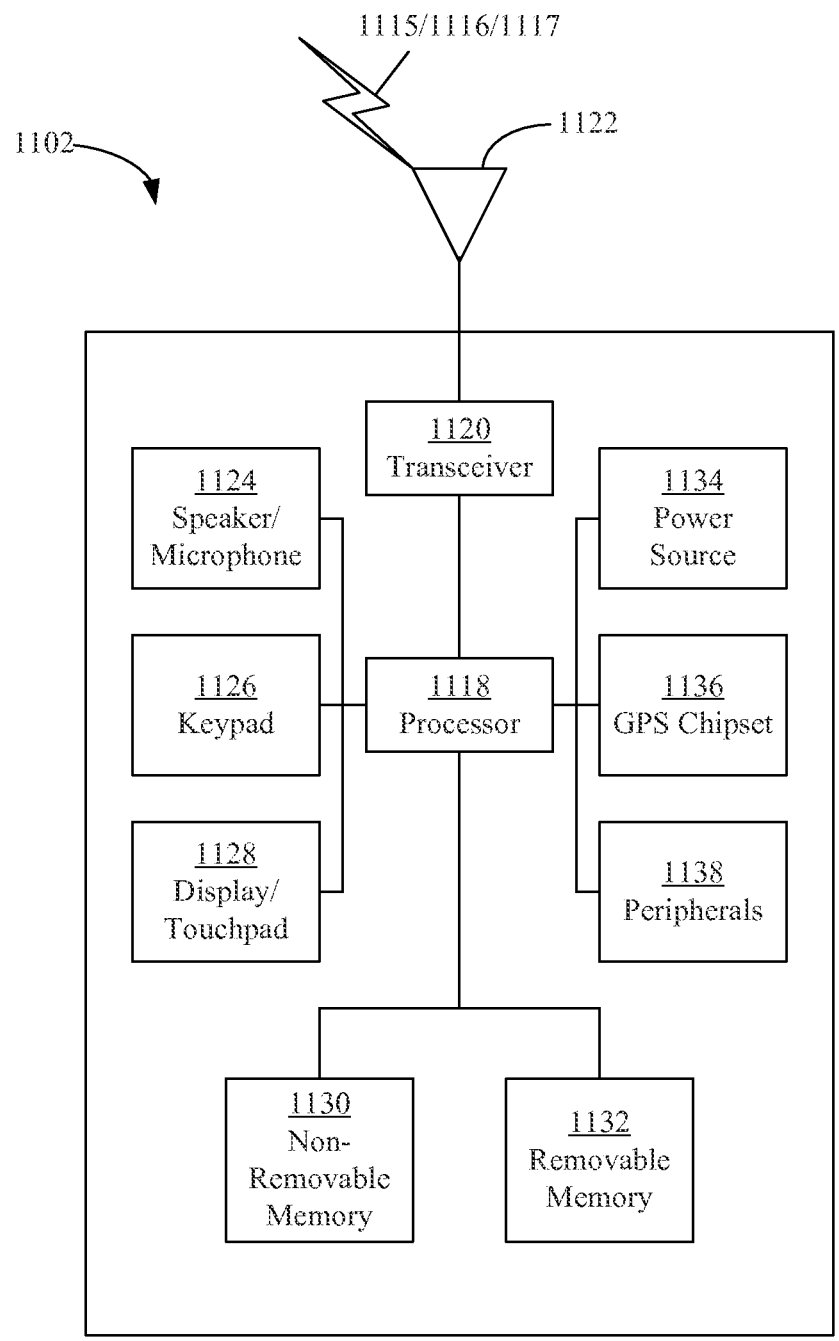
FIG. 10B is a system diagram of an example wireless transmit/receive unit (WTRU) that may be used within the communications system illustrated in FIG. 10A.

FIG. 10B is a system diagram of an example WTRU 1102. The WTRU 1102 may implement the methods disclosed herein. The WTRU 1102 may implement a decoder, for example the decoder in FIG. 4B. The WTRU 1102 may implement a color space conversion model defined as described herein (e.g., that defined by equations (9), (10) and (11)). The WTRU 1102 may implement triangular interpolation, for example as disclosed in relation to FIG. 8. The WTRU 1102 may implement a color space conversion model as described herein (e.g., that defined by equations (12), (13) and (14)). The WTRU 1102 may implement linear interpolation, for example as disclosed in relation to FIG. 8.

As shown in FIG. 10B, the WTRU 1102 may include a processor 1118, a transceiver 1120, a transmit/receive element 1122, a speaker/microphone 1124, a keypad 1126, a display/touchpad 1128, non-removable memory 1130, removable memory 1132, a power source 1134, a global positioning system (GPS) chipset 1136, and other peripherals 1138. It will be appreciated that the WTRU 1102 may include any sub-combination of the foregoing elements while remaining consistent with an embodiment. Also, embodiments contemplate that the base stations 1114a and 1114b, and/or the nodes that base stations 1114a and 1114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 10B and described herein.

The processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a slate machine, and the like. The processor 1118 may perform signal coding (e.g., video signal coding, for example as shown in FIG. 4A), signal decoding (e.g., video signal decoding, for example as shown in FIG. 4B), data processing, power control, input/output processing, and/or any other functionality that enables the WTRU 1102 to operate in a wireless environment. The processor 1118 may perform color space conversion as disclosed herein. The processor 1118 may be coupled to the transceiver 1120, which may be coupled to the transmit/receive element 1122. While FIG. 10B depicts the processor 1118 and the transceiver 1120 as separate components, it will be appreciated that the processor 1118 and the transceiver 1120 may be integrated together in an electronic package or chip.

The transmit/receive element 1122 may be configured to transmit signals to, or receive signals (e.g., receive video signals) from, a base station (e.g., the base station 1114a) over the air interface 1115/1116/1117. For example, in one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, for example. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 10B as a single element, the WTRU 1102 may include any number of transmit/receive elements 1122. More specifically, the 1102 may employ MIMO technology. Thus, in one embodiment, the WTRU 1102 may include two or more transmit/receive elements 1122 (e.g., multiple antennas) for transmitting and receiving wireless signals over the air interface 1115/1116/1117.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as UTRA and IEEE 802.11, for example.

The processor 1118 of the WTRU 1102 may be coupled to, and may receive user input data (e.g., a command to perform color space conversion as disclosed herein) from, the speaker/microphone 1124, the keypad 1126, and/or the display/touchpad 1128 (e.g., a liquid crystal display (LCD) display unit or organic light-emitting diode (OLED) display unit). The processor 1118 may also output user data (e.g., display an output of the color space conversion disclosed herein) to the speaker/microphone 1124, the keypad 1126, and/or the display/touchpad 1128. In addition, the processor 1118 may access information from, and store data in, any type of suitable memory (e.g., a non-transitory memory that may store the color space conversion model, model parameters, a LUT with predetermined or known second color space values at certain points such as vertices of partitions, etc.), such as the non-removable memory 1130 and/or the removable memory 1132. The non-removable memory 1130 may include random-access memory (RAM), read-only memory (ROM), a hard disk, or any other type of memory storage device. The removable memory 1132, may include a subscriber identity module (SIM) card, a memory stick, a secure digital (SD) memory card, and the like, in other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. For example, the power source 1134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1118 may also be coupled to the GPS chipset 1136, which may be configured to provide location information (e.g., longitude and latitude) regarding the current location of the WTRU 1102. In addition to or m lieu of the information front the GPS chipset 1136 the WTRU 1102 may receive location information over the air interface 1115/1116/1117 from a base station (e.g., base stations 1114a, 1114b) and/or determine its location based on the timing of the signals being received from two or more nearby base stations. It will be appreciated that the WTRU 1102 may acquire location information by way of any suitable location-determination implementation while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10C:
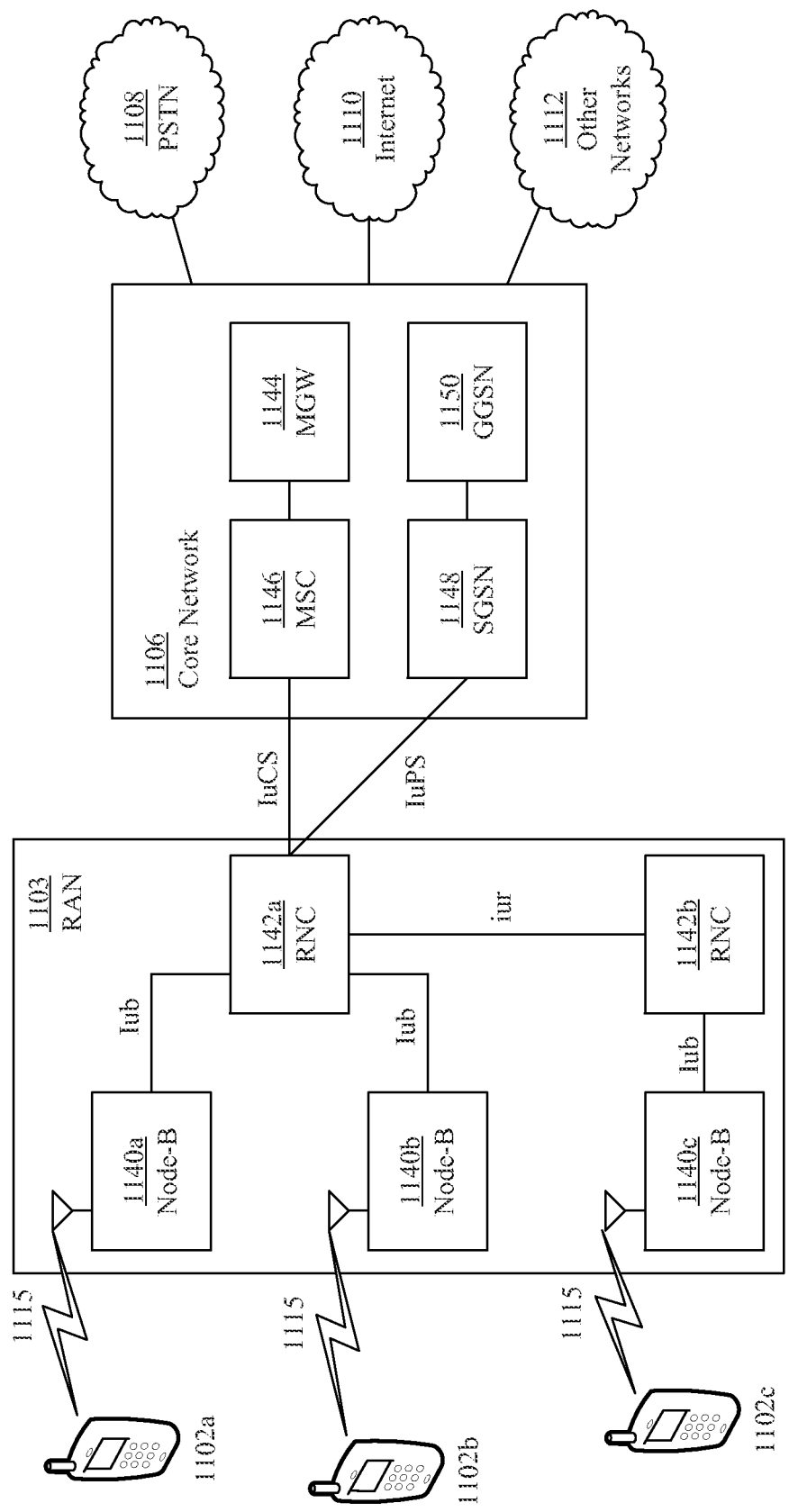
FIG. 10C is a system diagram of an example radio access network and an example core network that may be used within the communications system illustrated in FIG. 10A.

FIG. 10C is a system diagram of the RAN 1103 and the core network 1106 according to an embodiment. As noted above, the RAN 1103 may employ a UTRA radio technology to communicate with the WTRUs 1102a, 1102b, 1102c over the air interface 1115. The RAN 1103 may also be in communication with the core network 1106. As shown in FIG. 10C, the RAN 1103 may include Node-Bs 1140a, 1140b, 1140c which may each include one or more transceivers for communicating with the WTRUs 1102a, 1102b, 1102c over the air interface 1115. The Node-Bs 1140a, 1140b, 1140c may each be associated with a particular cell (not shown) within the RAN 1103. The RAN 1103 may also include RNCs 1142a, 1142b. It will be appreciated that the RAN 1103 may include any number of Node-Bs and RNCs while remaining consistent with an embodiment.

As shown in FIG. 10C, the Node-Bs 1140a, 1140b may be in communication with the RNC 1142a. Additionally, the Node-B 1140c may be in communication with the RNC 1142b. The Node-Bs 1140a, 1140b, 1140c may communicate with the respective RNCs 1142a, 1142b via an Iub interface. The RNCs 1142a, 1142b may be in communication with one another via an Iur interface. Each of the RNCs 1142a, 1142b may be configured to control the respective Node-Bs 1140a, 1140b, 1140c to which it is connected. In addition, each of the RNCs 1142a, 1142b may be configured to carry out or support other functionality, such as outer loop power control, load control, admission control, packet scheduling, handover control, macrodiversity, security functions, data encryption, and the like.

The core network 1106 shown in FIG. 10C may include a media gateway (MGW) 1144, a mobile switching center (MSC) 1146, a serving GPRS support node (SGSN) 1148, and/or a gateway GPRS support node (GGSN) 1150. While each of the foregoing elements are depicted as part of the core network 1106, it will be appreciated that any one of these elements may be owned and/or operated by an entity other than the core network operator.

The RNC 1142a in the RAN 1103 may be connected to the MSC 1146 in the core network 1106 via an IuCS interface. The MSC 146 may be connected to the MGW 1144. The MSC 1146 and the MGW 1144 may provide WTRUs 1102a, 1102b, 1102c with access to circuit-switched networks, such as the PSTN 1108, to facilitate communications between the WTRUs 1102a, 1102b, 1102c and traditional land-line communications devices.

The RNC 1142a in the RAN 1103 may also be connected to the SGSN 1148 in the core network 1106 via an IuPS interface. The SGSN 1148 may be connected to the GGSN 1150. The SGSN 1148 and the GGSN 1150 may provide the WTRUs 1102a, 1102b, 1102c with access to packet-switched networks, such as the Internet 1110, to facilitate communications between and the WTRUs 1102a, 1102b, 1102c and IP-enabled devices.

As noted above, the core network 1106 may also be connected to the networks 1112, which may include other wired or wireless networks that are owned and/or operated by other service providers.

Figure 10D:
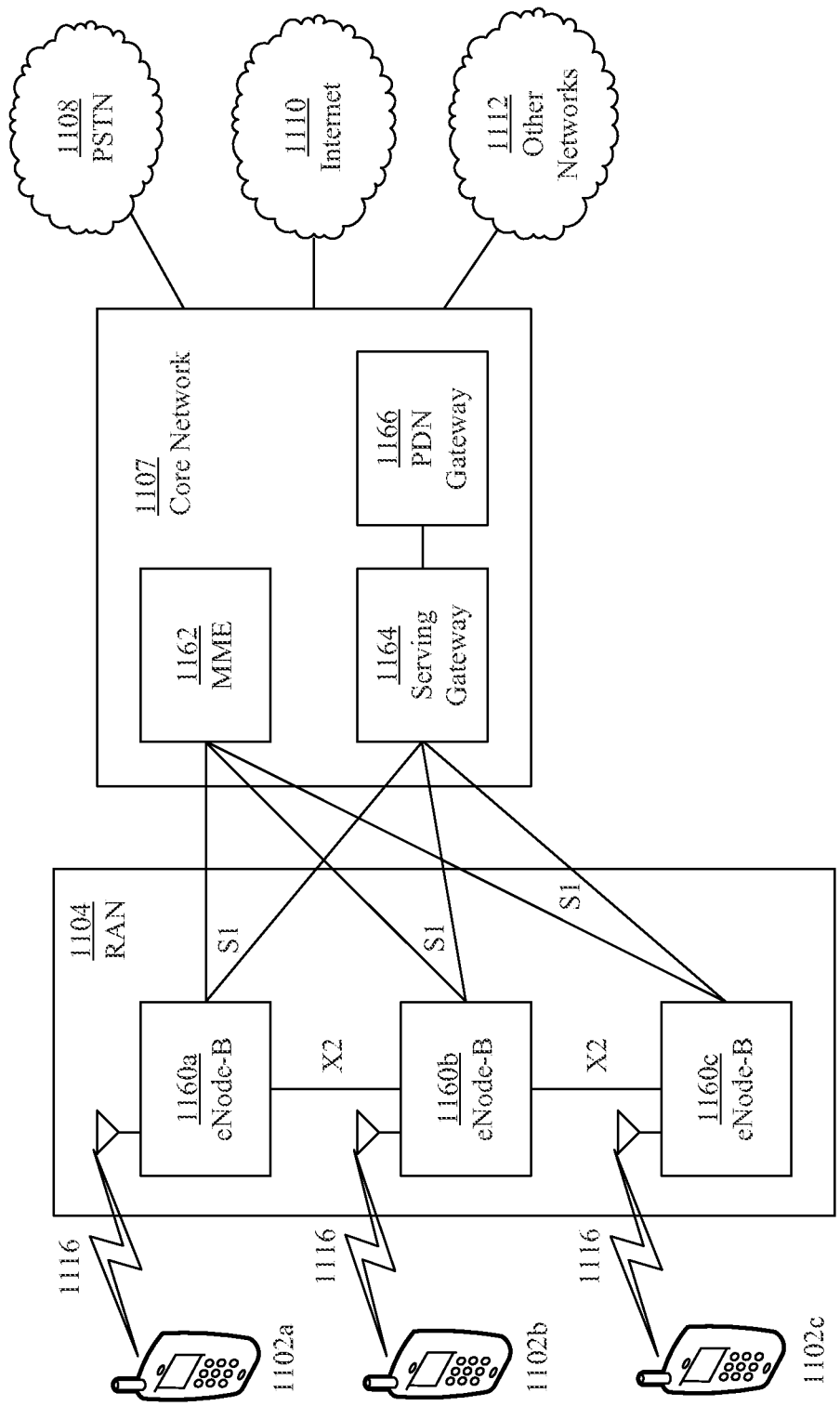
FIG. 10D is a system diagram of another example radio access network and another example core network that may be used within the communications system illustrated in FIG. 10A.

FIG. 10D is a system diagram of the RAN 1104 and the core network 1107 according to an embodiment. As noted above, the RAN 1104 may employ an E-UTRA radio technology to communicate with the WTRUs 1102a, 1102b, 1102c over the air interface 1116. The RAN 1104 may also be in communication with the core network 1107.

The RAN 1104 may include eNote-Bs 1160a, 1160b, 1160c, though it will be appreciated that the RAN 1104 may include any number of eNode-Bs while remaining consistent with an embodiment. The eNode-Bs 1160a, 1160b, 1160c may each include one or more transceivers for communicating with the WTRUs 1102a, 1102b, 1102c over the air interface 1116. In one embodiment, the eNode-Bs 1160a, 1160b, 1160c may implement MIMO technology. Thus, the eNode-B 1 160a, for example, may use multiple antennas to transmit wireless signals to, and receive wireless signals from, the WTRU 1102a.

Each of the eNode-Bs 1160a, 1160b, 1160c may be associated with a particular cell (not shown) and may be configured to handle radio resource management decisions, handover decisions, scheduling of users in the uplink and/or downlink, and the like. As shown in FIG. 10D, the eNode-Bs 1160a, 1160b, 1160c may communicate with one another over an X2 interface.

The core network 1107 shown in FIG. 10D may include a mobility management gateway (MME) 1162, a serving gateway 1164, and a packet data network (PDN) gateway 1166. While each of the foregoing elements are depicted as part of the core network 1107, it will be appreciated that any one of these elements may be owned and/or operated by an entity other than the core network operator.

The MME 1162 may be connected to each of the eNode-Bs 1160a, 1160b, 1160c in the RAN 1104 via an S1 interface and may serve as a control node. For example, the MME 1162 may be responsible for authenticating users of the WTRUs 1102a, 1102b, 1102c, bearer activation/deactivation, selecting a particular serving gateway during an initial attach of the WTRUs 1102a, 1102b, 1102c, and the like. The MME 1162 may also provide a control plane function for switching between the RAN 1104 and other RANs (not shown) that employ other radio technologies, such as GSM or WCDMA.

The serving gateway 1164 may be connected to each of the eNode-Bs 1160a, 1160b, 1160c in the RAN 1104 via the S1 interface. The serving gateway 1164 may generally route and forward user data packets to/from the WTRUs 1102a, 1102b, 1102c, The serving gateway 1164 may also perform other functions, such as anchoring user planes during inter-eNode B handovers, triggering paging when downlink data is available for the WTRUs 1102a, 1102b, 1102c, managing and storing contexts of the WTRUs 1102a, 1102b, 1102c, and the like.

The serving gateway 1164 may also be connected to the PDN gateway 1166, which may provide the WTRUs 1102a, 1102b, 1102c with access to packet-switched networks, such as the Internet 1110, to facilitate communications between the WTRUs 1102a, 1102b, 1102c and IP-enabled devices.

The core network 1107 may facilitate communications with other networks. For example, the core network 1107 may provide the WTRUs 1102a, 110b, 1102c with access to circuit-switched networks, such as the PSTN 1108, to facilitate communications between the WTRUs 1102a, 1102b, 1102c and traditional land-line communications devices. For example, the core network 1107 may include, or may communicate with, an IP gateway an IP multimedia subsystem (IMS) server) that serves as an interface between the core network 1107 and the PSTN 1108. In addition, the core network 1107 may provide the WTRUs 1102a, 1102b, 1102c with access to the networks 1112, which may include other wired or wireless networks that are owned and/or operated by other service providers.

Figure 10E:
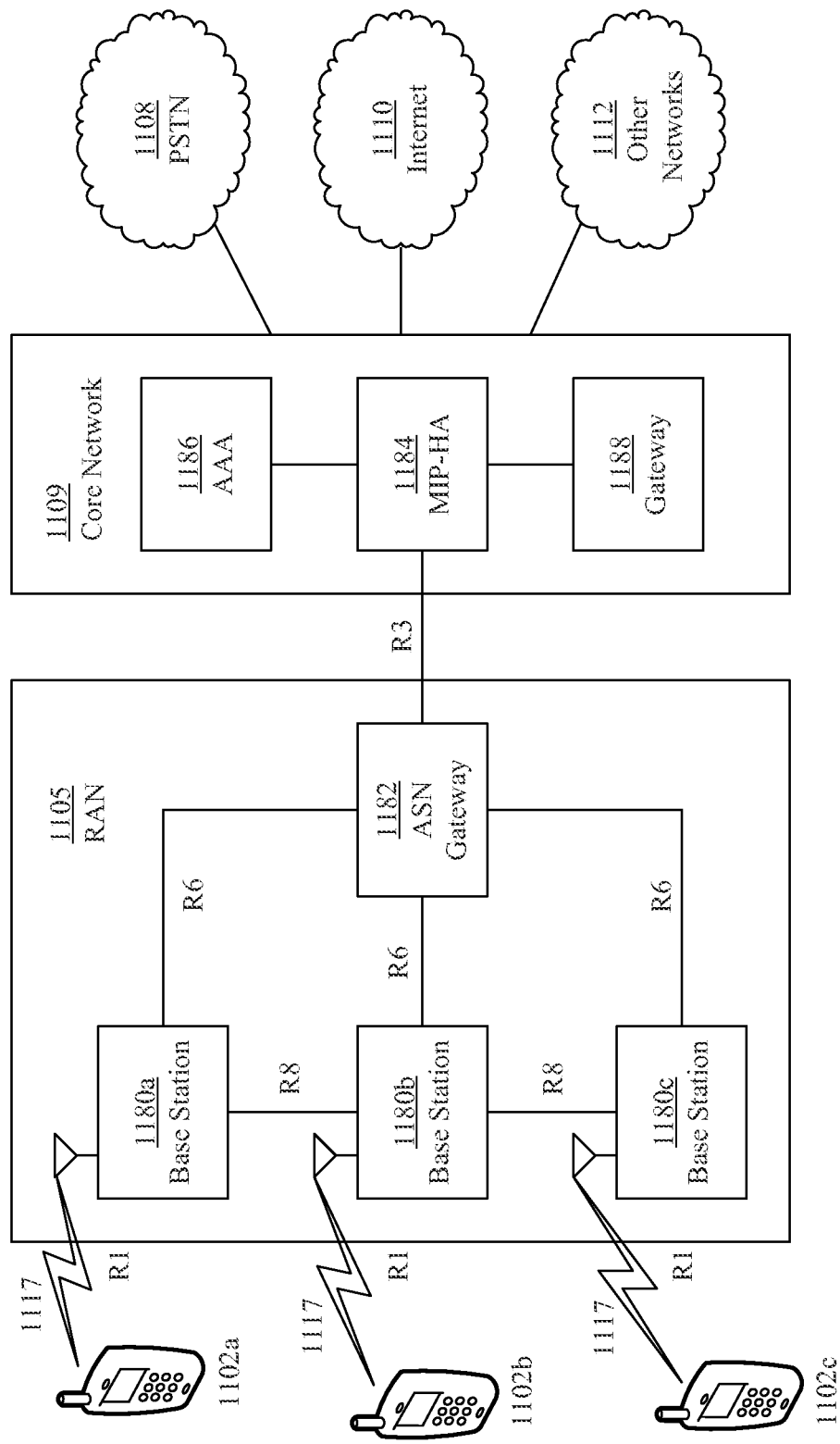
FIG. 10E is a system diagram of another example radio access network and another example core network that may be used within the communications system illustrated in FIG. 10A.

FIG. 10E is a system diagram of the RAN 1105 and the core network 1109 according to an embodiment. The RAN 1105 may be an access service network (ASN) that employs IEEE 802.16 radio technology to communicate with the WTRUs 1102a, 1102b, 1102 over the air interface 1117. As will be further discussed below, the communication links between the different functional entities of the WTRUs 1102a, 1102b, 1102c, the RAN 1105, and the core network 1109 may be defined as reference points.

As shown in FIG. 10E, the RAN 1105 may include base stations 1180a, 1180b, 1180c, and an ASN gateway 1182, though it will be appreciated that the RAN 1105 may include any number of base stations and ASN gateways while remaining consistent with an embodiment. The base stations 1180a, 1180b, 1180c may each be associated with a particular cell (not shown) in the RAN 1105 and may each include one or more transceivers for communicating with the WTRUs 1102a, 1102b, 1102c over the air interface 1117. In one embodiment, the base stations 1180a, 1180b, 1180c may implement MIMO technology. Thus, the base station 1180a, for example, may use multiple antennas to transmit wireless signals to, and receive wireless signals from, the WTRU 1102a. The base stations 1180a, 1180b 1180c may also provide mobility management functions, such as handoff triggering, tunnel establishment, radio resource management, traffic classification, quality of service (QoS) policy enforcement, and the like. The ASN gateway 1182 may serve as a traffic aggregation point and may be responsible for paging, caching of subscriber profiles, routing to the core network 1109, and the like.

The air interface 1117 between the WTRUs 1102a 1102b, 1102c and the RAN 1105 may be defined as an R1 reference point that implements the IEEE 802.16 specification. In addition, each of the WTRUs 1102a, 1102b, 1102c may establish a logical interface (not shown) with the core network 1109. The logical interface between the WTRUs 1102a, 1102b, 1102c and the core network 1109 may be defined as an R2 reference point, which may be used for authentication, authorization, IP host configuration management, and/or mobility management.

The communication link between each of the base stations 1180a, 1180b, 1180c may be defined as an R8 reference point that includes protocols for facilitating WTRU handover; and the transfer of data between base stations. The communication link between the base stations 1180a, 1180b, 1180c and the ASN gateway 1182 may be defined as an R6 reference point. The R6 reference point may include protocols for facilitating mobility management based on mobility, events associated with each of the WTRUs 1102a, 1102b, 1102c.

As shown in FIG. 10E, the RAN 1105 may be connected to the core network 1109. The communication link between the RAN 1105 and the core network 1109 may defined as an R3 reference point that includes protocols for facilitating data transfer and mobility management capabilities, for example. The core network 1109 may include a mobile IP home agent (MIP-HA) 1184, an authentication, authorization, accounting (AAA) server 1186, and a gateway 1188. While each of the foregoing elements are depicted as part of the core network 1109, it will be appreciated that any one of these elements may be owned and/or operated by an entity other than the core network operator.

The MIP-HA may be responsible for IP address management, and may enable the WTRUs 1102a, 1102b, 1102c to roam between different ASNs and/or different core networks. The MIP-HA 1184 may provide the WTRUs 1102a, 1102b, 1102c with access to packet-switched networks, such as the Internet 1110, to facilitate communications between the WTRUs 1102a, 1102b, 1102c and IP-enabled devices. The AAA server 1186 may be responsible for user authentication and for supporting user services. The gateway 1188 may facilitate interworking with other networks. For example, the gateway 1188 may provide the WTRUs 1102a, 1102b, 1102c with access to circuit-switched networks, such as the PSTN 1108, to facilitate communications between the WTRUs 1102a, 1102b, 1102c and traditional land-line communications devices. In addition, the gateway 1188 may provide the WTRUs 1102a, 1102b, 1102c with access to the networks 1112, which may include other wired or wireless networks that are owned and/or operated by other service providers.

Although not shown in FIG. 10E, it will be appreciated that the RAN 1105 may be connected to other ASNs and the core network 1109 may be connected to other core networks. The communication link between the RAN 1105 the other ASNs may be defined as an R4 reference point, which may include protocols for coordinating the mobility of the WTRUs 1102a, 1102b, 1102c between the RAN 1105 and the other ASNs. The communication link between the core network 1109 and the other core networks may be defined as an R5 reference, which may include protocols for facilitating interworking between home core networks and visited core networks.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or, processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. A method comprising:
    receiving a video signal associated with a first color space, the first color space comprising a point associated with a color;
    determining a partition of the first color space that includes the point; and
    converting the color from the first color space to a second color space having a same number of dimensions as the first color space, using a color space conversion model that corresponds to the partition, wherein a number of dimensions of the color space conversion model is less than a number of dimensions of the partition.

2. The method of claim 1, wherein the first color space and the second color space are characterized by three components, and wherein the three components comprise a luma component, a first chroma component and a second chroma component.

3. The method of claim 2, wherein the point is associated with a value for each of the three components, and wherein the color space conversion model determines a value of one of the three components in the second color space based on the values of two of the three components at the point in the first color space.

4. The method of claim 1, wherein the color space conversion model determines a value for a luma component in the second color space that corresponds with the point based on a luma value at the point in the first color space and either a first chroma value at the point in the first color space or a second chroma value at the point in the first color space, or
    wherein the color space conversion model determines a value for a first chroma component in the second color space that corresponds with the point based on the luma value of the point in the first color space and the first chroma value at the point in the first color space.

5. The method of claim 1, wherein determining the partition comprises partitioning the first color space into a plurality of partitions, and wherein a first partition of the plurality of partitions is associated with a first color space conversion model and a second partition of the plurality of partitions is associated with a second color space conversion model, and wherein the first color space conversion model and the second color space conversion model comprise different model parameters.

6. The method of claim 1, wherein the partition comprises an octant or a cube.

7. The method of claim 1, wherein converting the point from the first color space to the second color space comprises:
    determining a projection of the point in the partition onto a plane of the partition;
    determining a first distance of the projected point from a first axis in the plane;
    determining a second distance of the projected point from a second axis in the plane;
    determining three other points in the partition;
    determining three values of a first component in the second color space, wherein each of the three values corresponds with one of the three other points; and
    determining a value of the first component in the second color space that corresponds with the point based on the first distance, the second distance and the three values of the first component in the second color space.

8. The method of claim 7, wherein determining the value of the first component in the second color space that corresponds with the point comprises determining, in the second color space, the value of the first component that corresponds with the point using triangular interpolation,
wherein the first axis is associated with the first component and the second axis is associated with a second component, and
wherein determining the three values of the first component in the second color space comprises retrieving the three values from a LUT.

9. The method of claim 7, further comprising determining a value of a second component, in the second color space, that corresponds with the point, and wherein the value of the second component is determined based on a second projection of the point onto a second plane.

10. The method of claim 9, wherein the second plane comprises a luma axis and a chroma axis, or wherein the second plane comprises a first chroma axis and a second chroma axis.

11. The method of claim 1, wherein converting the point from the first color space to the second color space comprises:
determining a projection of the point in the partition onto an axis of the partition;
determining a distance of the projected point from a first point in the axis;
determining a second point in the axis;
determining two values of a first component in the second color space, wherein the two values correspond with the first point and the second point; and
determining a value of the first component in the second color space that corresponds with the point based on the distance and the two values of the first component in the second color space.

12. The method of claim 1, wherein the color is associated with a first color component, a second color component, and a third color component, and the color space conversion model determines a value of the first color component in the second color space that corresponds with the color based on the value of the first color component at the point in the first color space and either a value of the second color component at the point in the first color space or a value of the third color component at the point in the first color space.

13. A decoder comprising:
a processor configured to:
receive a video signal associated with a first color space, the first color space comprising a point associated with a color;
determine a partition of the first color space that includes the point, the partition having a number of dimensions; and
convert the color from the first color space to a second color space having a same number of dimensions as the first color space, using a color space conversion model that corresponds with the partition, the color space conversion model having a number of dimensions, wherein a number of dimensions of the color space conversion model is less than a number of dimensions of the partition.

14. The decoder of claim 13, wherein the first color space and the second color space are characterized by three components, and wherein the three components comprise a luma component, a first chroma component and a second chroma component.

15. The decoder of claim 14, wherein the point is associated with a value for each of the three components, and wherein the color space conversion model determines a value of one of the three components in the second color space based on the values of two of the three components at the point in the first color space.

16. The decoder of claim 13, wherein the color space conversion model determines a value for a luma value component in the second color space that corresponds with the point based on a luma value at the point in the first color space and either a first chroma value at the point in the first color space or a second chroma value at the point in the first color space, or
wherein the color space conversion model determines a value for a first chroma component in the second color space that corresponds with the point based on the luma value of the point in the first color space and the first chroma value at the point in the first color space.

17. The decoder of claim 13, wherein the processor is configured to determine the partition by partitioning the first color space into a plurality of partitions, and
wherein a first partition of the plurality of partitions is associated with a first color space conversion model and a second partition of the plurality of partitions is associated with a second color space conversion model, and wherein the first color space conversion model and the second color space conversion model comprise different model parameters.

18. The decoder of claim 13, wherein the number of dimensions of the partition is three-dimensions and the number of dimensions of the color space conversion model is two-dimensions.

19. The decoder of claim 13, wherein the processor is configured to convert the point from the first color space to the second color space by:
determining a projection of the point in the partition onto a plane of the partition;
determining a first distance of the projected point from a first axis in the plane;
determining a second distance of the projected point from a second axis in the plane;
determining three other points in the partition;
determining three values of a first component in the second color space, wherein each of the three values corresponds with one of the three other points; and
determining a value of the first component in the second color space that corresponds with the point based on the first distance, the second distance and the three values of the first component in the second color space.

20. The decoder of claim 19, wherein determining the value of the first component in the second color space that corresponds with the point comprises determining, in the second color space, the value of the first component that corresponds with the point using triangular interpolation,
wherein the first axis is associated with the first component and the second axis is associated with a second component, and
wherein determining the three values of the first component in the second color space comprises retrieving the three values from memory.

21. The decoder of claim 19, wherein the processor is further configured to determine a value of a second component, in the second color space, that corresponds with the point, and wherein the value of the second component is determined based on a second projection of the point onto a second plane.

22. The decoder of claim 21, wherein the second plane comprises a luma axis and a chroma axis, or wherein the second plane comprises a first chroma axis and a second chroma axis.

23. The decoder of claim 13, wherein the processor is configured to convert the point from the first color space to the second color space by:
   determining a projection of the point in the partition onto an axis of the partition;
   determining a distance of the projected point from a first point in the axis;
   determining a second point in the axis;
   determining two values of a first component in the second color space, wherein the two values correspond with the first point and the second point; and
   determining a value of the first component in the second color space that corresponds with the point based on the distance and the two values of the first component in the second color space.

24. The decoder of claim 13, wherein the color space conversion model determines a value of a first color component in the second color space based on values of two of three color components at the point in the first color space.

* * * * *